(12) United States Patent
Kim et al.

(10) Patent No.: US 12,003,157 B2
(45) Date of Patent: Jun. 4, 2024

(54) TRANSVERSE FLUX RECIPROCATING MOTOR AND LINEAR COMPRESSOR INCLUDING THE SAME

(71) Applicant: LG ELECTRONICS INC., Seoul (KR)

(72) Inventors: Jaebeum Kim, Seoul (KR); Sangsub Jeong, Seoul (KR); Sanga Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 17/375,132

(22) Filed: Jul. 14, 2021

(65) Prior Publication Data

US 2022/0069689 A1 Mar. 3, 2022

(30) Foreign Application Priority Data

Aug. 28, 2020 (KR) .................. 10-2020-0109399

(51) Int. Cl.
| | | |
|---|---|---|
| H02K 33/16 | (2006.01) | |
| F04B 53/14 | (2006.01) | |
| F04B 53/16 | (2006.01) | |
| F25B 31/02 | (2006.01) | |

(52) U.S. Cl.
CPC ............. *H02K 33/16* (2013.01); *F04B 53/14* (2013.01); *F04B 53/16* (2013.01); *F25B 31/023* (2013.01); *H02K 2201/12* (2013.01)

(58) Field of Classification Search
CPC .... H02K 33/16; H02K 2201/12; F04B 53/14; F04B 53/16; F25B 31/023
See application file for complete search history.

(56) References Cited

U.S. PATENT DOCUMENTS

2018/0219444 A1* 8/2018 Kim .................... H02K 7/14
2019/0245425 A1* 8/2019 Kim .................... H02K 1/17

FOREIGN PATENT DOCUMENTS

| JP | 11187638 | 7/1999 |
|---|---|---|
| JP | 2007318858 | 12/2007 |
| KR | 101484324 | 1/2015 |

(Continued)

OTHER PUBLICATIONS

Office Action in Korean Appln. No. 10-2020-0109399, dated May 21, 2022, 13 pages (with English translation).

(Continued)

*Primary Examiner* — Grant Moubry
*Assistant Examiner* — Ruben Picon-Feliciano
(74) *Attorney, Agent, or Firm* — Fish & Richardson P.C.

(57) ABSTRACT

A transverse flux reciprocating motor and a linear compressor including the same are described. The transverse flux reciprocating motor includes an outer stator including a stator core, a teeth portion extended from the stator core to an inside, and a teeth shoe extended from an inner end of the teeth portion in a circumferential direction; a coil disposed on the teeth portion; an inner stator disposed in the outer stator and configured to reciprocate in an axial direction due to an electromagnetic interaction with the coil; and a magnet disposed on the teeth shoe and facing the inner stator. The stator core includes a plurality of core plates stacked in the axial direction. The magnet includes first and second magnets that are spaced from each other in the axial direction.

18 Claims, 18 Drawing Sheets

(56) References Cited

FOREIGN PATENT DOCUMENTS

| KR | 10-2018-0089746 | 8/2018 |
| KR | 10-2018-0091461 | 8/2018 |
| KR | 10-2018-0093412 | 8/2018 |
| KR | 10-2020-0100275 | 8/2020 |

OTHER PUBLICATIONS

Notice of Allowance in Korean Appln. 10-2020-0109399, dated Mar. 20, 2023, 5 pages (with English translation).
Office Action in Korean Appln. 10-2020-0109399, dated Jan. 9, 2023, 10 pages (with English translation).

* cited by examiner

TRANSVERSE FLUX RECIPROCATING MOTOR AND LINEAR COMPRESSOR INCLUDING THE SAME

CROSS-REFERENCE TO RELATED APPLICATIONS

This application claims the benefit of Korea Patent Application No. 10-2020-0109399, filed on Aug. 28, 2020, which is incorporated herein by reference for all purposes as if fully set forth herein.

TECHNICAL FIELD

The present disclosure relates to a transverse flux reciprocating motor and a linear compressor including the same. More specifically, the present disclosure relates to a transverse flux reciprocating motor, in which a direction of a magnetic flux and a direction of a linear reciprocating motion of a piston form a right angle, and a linear compressor including the same.

BACKGROUND

In general, a compressor refers to a device that is configured to receive power from a power generator such as a motor or a turbine and compress a working fluid such as air or refrigerant. More specifically, the compressors are widely used in the whole industry or home appliances, such as for a steam compression refrigeration cycle (hereinafter, referred to as "refrigeration cycle").

The compressors may be classified into a reciprocating compressor, a rotary compressor, and a scroll compressor according to a method of compressing the refrigerant.

The reciprocating compressor uses a method in which a compression space is formed between a piston and a cylinder, and the piston linearly reciprocates to compress a fluid. The rotary compressor uses a method of compressing a fluid by a roller that eccentrically rotates inside a cylinder. The scroll compressor uses a method of compressing a fluid by engaging and rotating a pair of spiral scrolls.

Recently, among the reciprocating compressors, the use of linear compressors that uses a linear reciprocating motion without using a crank shaft is gradually increasing. The linear compressor has advantages in that it has less mechanical loss resulting from switching a rotary motion to the linear reciprocating motion and thus can improve the efficiency, and has a relatively simple structure.

The linear compressor is configured such that a cylinder is positioned in a casing forming a sealed space to define a compression chamber, and a piston covering the compression chamber reciprocates in the cylinder. The linear compressor repeats a process in which a fluid in the sealed space is sucked into the compression chamber while the piston is positioned at a bottom dead center (BDC), and the fluid of the compression chamber is compressed and discharged while the piston is positioned at a top dead center (TDC).

A compression unit and a drive unit are installed inside the linear compressor. The compression unit performs a process of compressing and discharging a refrigerant while performing a resonant motion by a resonant spring through a movement generated in the drive unit.

The piston of the linear compressor repeatedly performs a series of processes of sucking the refrigerant into the casing through an intake pipe while reciprocating at high speed inside the cylinder by the resonant spring, and then discharging the refrigerant from a compression space through a forward movement of the piston to move it to a condenser through a discharge pipe.

The linear compressor may be classified into an oil lubricated linear compressor and a gas lubricated linear compressor according to a lubrication method.

The oil lubricated linear compressor is configured to store a predetermined amount of oil in the casing and lubricate between the cylinder and the piston using the oil.

On the other hand, the gas lubricated linear compressor is configured not to store an oil in the casing, induce a part of the refrigerant discharged from the compression space between the cylinder and the piston, and lubricate between the cylinder and the piston by a gas force of the refrigerant.

The oil lubricated linear compressor supplies the oil of a relatively low temperature between the cylinder and the piston and thus can suppress the cylinder and the piston from being overheated by motor heat or compression heat, etc. Hence, the oil lubricated linear compressor suppresses specific volume from increasing as the refrigerant passing through an intake flow path of the piston is sucked into the compression chamber of the cylinder and is heated, and thus can prevent in advance an intake loss from occurring.

However, when the refrigerant and an oil discharged to a refrigeration cycle device are not smoothly returned to the compressor, the oil lubricated linear compressor may experience an oil shortage in the casing of the compressor. The oil shortage in the casing may lead to a reduction in reliability of the compressor.

On the other hand, the gas lubricated linear compressor has advantages in that it can be made smaller than the oil lubricated linear compressor, and there is no reduction in the reliability of the compressor due to the oil shortage because it lubricates between the cylinder and the piston using the refrigerant.

A related art transverse flux reciprocating motor required a more amount of coil than a longitudinal linear motor, in order to generate the same output as the longitudinal linear motor. In this case, there was a problem that an outer diameter of the transverse flux reciprocating motor increased, leading to an increase in a height of the linear compressor.

Further, there was a problem that a mechanical resonance spring formed of a compression coil spring was installed in the related art transverse flux reciprocating motor, resulting in a limitation on a mechanical stress limit and a vibration distance. In addition, there was a problem that a mover was eccentric by a side force due to characteristics of the compression coil spring, resulting in a friction loss between the mover and a stator.

PRIOR ART DOCUMENT (Patent Document 1) Korean Patent No. 10-1484324 B (published on Jan. 20, 2015)

SUMMARY

An object of the present disclosure is to provide a transverse flux reciprocating motor and a linear compressor including the same capable of reducing an outer diameter of the transverse flux reciprocating motor and reducing a height of the linear compressor.

Another object of the present disclosure is to provide a transverse flux reciprocating motor and a linear compressor including the same capable of solving a limitation on a mechanical stress limit and a vibration distance by removing a mechanical resonance spring.

Another object of the present disclosure is to provide a transverse flux reciprocating motor and a linear compressor including the same capable of reducing a friction loss between a mover and a stator that is generated because the mover is eccentric by a side force.

To achieve the above-described and other objects, in one aspect of the present disclosure, there is provided a transverse flux reciprocating motor comprising an outer stator comprising a stator core, a teeth portion extended from the stator core to an inside, and a teeth shoe extended from an inner end of the teeth portion in a circumferential direction; a coil disposed on the teeth portion; an inner stator disposed in the outer stator and configured to reciprocate in an axial direction due to an electromagnetic interaction with the coil; and a magnet disposed on the teeth shoe and facing the inner stator.

In this case, the stator core may comprise a plurality of core plates stacked in the axial direction, and the magnet may comprise first and second magnets that are spaced from each other in the axial direction.

That is, the present disclosure can reduce an outer diameter of the transverse flux reciprocating motor by increasing an amount of the coil in the axial direction, and can reduce a height of a linear compressor.

In addition, the present disclosure can solve a limitation on a mechanical stress limit and a vibration distance by removing a mechanical resonance spring, and can reduce a friction loss between a mover and a stator that is generated because the mover is eccentric by a side force.

The coil may comprise a plurality of coils that are spaced from each other in the circumferential direction and are provided as an even number. Each of the plurality of coils may form a magnetic flux in an opposite direction to a coil that is adjacent in the circumferential direction.

The coil may comprise a plurality of coils that are spaced from each other in the circumferential direction and are provided as an even number. The plurality of coils may be disposed at positions symmetrical to each other with respect to a center area of the outer stator.

Each of the first and second magnets may comprise a plurality of first and second magnets that are spaced from each other in the circumferential direction and are provided as an even number. Each of the plurality of first and second magnets may have a different magnetic pole from a magnet that is adjacent in the circumferential direction. Each of the plurality of first and second magnets may have a different magnetic pole from a magnet that is adjacent in the axial direction.

Each of the first and second magnets may comprise a plurality of first and second magnets that are spaced from each other in the circumferential direction and are provided as an even number. The plurality of first and second magnets may be disposed at positions symmetrical to each other with respect to a center area of the outer stator.

An axial length of the inner stator may correspond to an axial length of the first magnet or the second magnet.

An axial length of the outer stator may be greater than a sum of an axial length of the first magnet, an axial length of the second magnet, and an axial separation distance between the first magnet and the second magnet.

An axial length of the outer stator may be less than a sum of an axial length of the first magnet, an axial length of the second magnet, and an axial separation distance between the first magnet and the second magnet.

In another aspect of the present disclosure, there is provided a transverse flux reciprocating motor comprising an outer stator comprising a stator core, a teeth portion extended from the stator core to an inside, and a teeth shoe extended from an inner end of the teeth portion in a circumferential direction; a coil disposed on the teeth portion; an inner stator disposed in the outer stator and configured to reciprocate in an axial direction due to an electromagnetic interaction with the coil; a magnet disposed on the teeth shoe and facing the inner stator; and a virtual pole disposed on the teeth shoe, facing the inner stator, and spaced from the magnet in the axial direction.

In this case, the stator core may comprise a plurality of core plates stacked in the axial direction.

That is, the present disclosure can reduce an outer diameter of the transverse flux reciprocating motor by increasing an amount of the coil in the axial direction, and can reduce a height of a linear compressor.

In addition, the present disclosure can solve a limitation on a mechanical stress limit and a vibration distance by removing a mechanical resonance spring, and can reduce a friction loss between a mover and a stator that is generated because the mover is eccentric by a side force.

The coil may comprise a plurality of coils that are spaced from each other in the circumferential direction and are provided as an even number. Each of the plurality of coils may form a magnetic flux in an opposite direction to a coil that is adjacent in the circumferential direction.

The coil may comprise a plurality of coils that are spaced from each other in the circumferential direction and are provided as an even number. The plurality of coils may be disposed at positions symmetrical to each other with respect to a center area of the outer stator.

The magnet and the virtual pole may comprise a plurality of magnets and a plurality of virtual poles that are spaced from each other in the circumferential direction and are provided as an even number, respectively. The plurality of magnets and the plurality of virtual poles each may have a different magnetic pole from a magnet or a virtual pole that is adjacent in the circumferential direction. The plurality of magnets and the plurality of virtual poles each may have a different magnetic pole from a magnet or a virtual pole that is adjacent in the axial direction.

The magnet and the virtual pole may comprise a plurality of magnets and a plurality of virtual poles that are spaced from each other in the circumferential direction and are provided as an even number, respectively. The plurality of magnets may be disposed at positions symmetrical to each other with respect to a center area of the outer stator, and the plurality of virtual poles are disposed at positions symmetrical to each other with respect to a center area of the outer stator.

An axial length of the inner stator may correspond to an axial length of the magnet or the virtual pole.

An axial length of the outer stator may be greater than a sum of an axial length of the magnet, an axial length of the virtual pole, and an axial separation distance between the magnet and the virtual pole.

An axial length of the outer stator may be less than a sum of an axial length of the magnet, an axial length of the virtual pole, and an axial separation distance between the magnet and the virtual pole.

The virtual pole may be formed integrally with the teeth shoe.

An axial length of the inner stator may correspond to an axial length of the magnet. An axial length of the outer stator may be greater than a sum of an axial length of the magnet, an axial length of the virtual pole, and an axial separation distance between the magnet and the virtual pole.

In another aspect of the present disclosure, there is provided a linear compressor comprising a frame; an outer stator disposed in the frame, the outer stator comprising a stator core, a teeth portion extended from the stator core to an inside, and a teeth shoe extended from an inner end of the teeth portion in a circumferential direction; a coil disposed on the teeth portion; a cylinder disposed in the frame; a piston disposed in the cylinder; an inner stator coupled to the piston and configured to reciprocate in an axial direction due to an electromagnetic interaction with the coil; and a magnet disposed on the teeth shoe and facing the inner stator, In this case, the stator core may comprise a plurality of core plates stacked in the axial direction. The magnet may comprise first and second magnets that are spaced from each other in the axial direction.

That is, the present disclosure can reduce an outer diameter of the transverse flux reciprocating motor by increasing an amount of the coil in the axial direction, and can reduce a height of a linear compressor.

In addition, the present disclosure can solve a limitation on a mechanical stress limit and a vibration distance by removing a mechanical resonance spring, and can reduce a friction loss between a mover and a stator that is generated because the mover is eccentric by a side force.

In another aspect of the present disclosure, there is provided a linear compressor comprising a frame; an outer stator disposed in the frame, the outer stator comprising a stator core, a teeth portion extended from the stator core to an inside, and a teeth shoe extended from an inner end of the teeth portion in a circumferential direction; a coil disposed on the teeth portion; a cylinder disposed in the frame; a piston disposed in the cylinder; an inner stator coupled to the piston and configured to reciprocate in an axial direction due to an electromagnetic interaction with the coil; a magnet disposed on the teeth shoe and facing the inner stator; and a virtual pole disposed on the teeth shoe, facing the inner stator, and spaced from the magnet in the axial direction.

In this case, the stator core may comprise a plurality of core plates stacked in the axial direction.

That is, the present disclosure can reduce an outer diameter of the transverse flux reciprocating motor by increasing an amount of the coil in the axial direction, and can reduce a height of a linear compressor.

In addition, the present disclosure can solve a limitation on a mechanical stress limit and a vibration distance by removing a mechanical resonance spring, and can reduce a friction loss between a mover and a stator that is generated because the mover is eccentric by a side force.

The present disclosure can provide a transverse flux reciprocating motor and a linear compressor including the same capable of reducing an outer diameter of the transverse flux reciprocating motor and reducing a height of the linear compressor.

The present disclosure can also provide a transverse flux reciprocating motor and a linear compressor including the same capable of solving a limitation on a mechanical stress limit and a vibration distance by removing a mechanical resonance spring.

The present disclosure can also provide a transverse flux reciprocating motor and a linear compressor including the same capable of reducing a friction loss between a mover and a stator that is generated because the mover is eccentric by a side force.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

It should be understood that when a component is described as being "connected to" or "coupled to" other component, it may be directly connected or coupled to the other component or intervening component(s) may be present.

It will be noted that a detailed description of known arts will be omitted if it is determined that the detailed description of the known arts can obscure embodiments of the present disclosure. The accompanying drawings are used to help easily understand various technical features and it should be understood that embodiments presented herein are not limited by the accompanying drawings. As such, the present disclosure should be understand to extend to any alterations, equivalents and substitutes in addition to those which are particularly set out in the accompanying drawings.

In addition, a term of "disclosure" may be replaced by document, specification, description, etc.

Figure 1:
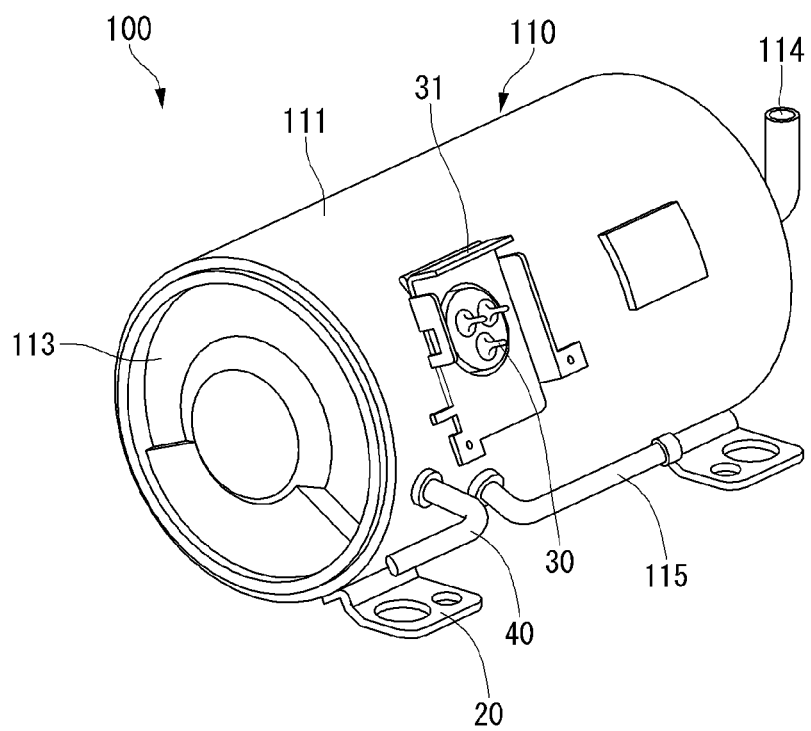
FIG. 1 is a perspective view of a linear compressor according to an embodiment of the present disclosure.

FIG. 1 is a perspective view of a compressor according to an embodiment of the present disclosure.

Referring to FIG. 1, a linear compressor 100 according to an embodiment of the present disclosure may include a shell 111 and shell covers 112 and 113 coupled to the shell 111. In a broad sense, the shell covers 112 and 113 can be understood as one configuration of the shell 111.

Legs 20 may be coupled to a lower side of the shell 111. The legs 20 may be coupled to a base of a product on which the linear compressor 100 is mounted. For example, the product may include a refrigerator, and the base may include a machine room base of the refrigerator. As another example, the product may include an outdoor unit of an air conditioner, and the base may include a base of the outdoor unit.

The shell 111 may have a substantially cylindrical shape and may be disposed to lie in a horizontal direction or an axial direction. FIG. 1 illustrates that the shell 111 is extended in the horizontal direction and has a slightly low height in a radial direction, by way of example. That is, since the linear compressor 100 can have a low height, there is an advantage in that a height of the machine room can decrease when the linear compressor 100 is installed in, for example, the machine room base of the refrigerator.

A longitudinal central axis of the shell 111 coincides with a central axis of a main body of the compressor 100 to be described below, and the central axis of the main body of the compressor 100 coincides with a central axis of a cylinder 140 and a piston 150 that constitute the main body of the compressor 100.

A terminal 30 may be installed on an outer surface of the shell 111. The terminal 30 may transmit external electric power to a drive unit 130 of the linear compressor 100. More specifically, the terminal 30 may be connected to a lead line of a coil 132.

A bracket 31 may be installed on the outside of the terminal 30. The bracket 31 may include a plurality of brackets surrounding the terminal 30. The bracket 31 may perform a function of protecting the terminal 30 from an external impact, etc.

Both sides of the shell 111 may be opened. The shell covers 112 and 113 may be coupled to both sides of the opened shell 111. More specifically, the shell covers 112 and 113 may include a first shell cover 112 coupled to one opened side of the shell 111 and a second shell cover 113 coupled to the other opened side of the shell 111. An inner space of the shell 111 may be sealed by the shell covers 112 and 113.

FIG. 1 illustrates that the first shell cover 112 is positioned on the right side of the linear compressor 100, and the second shell cover 113 is positioned on the left side of the linear compressor 100, by way of example. In other words, the first and second shell covers 112 and 113 may be disposed to face each other. It can be understood that the first shell cover 112 is positioned on an intake side of a refrigerant, and the second shell cover 113 is positioned on a discharge side of the refrigerant.

The linear compressor 100 may include a plurality of pipes 114, 115, and 40 that are included in the shell 111 or the shell covers 112 and 113 and can suck, discharge, or inject the refrigerant.

The plurality of pipes 114, 115, and 40 may include an intake pipe 114 that allows the refrigerant to be sucked into the linear compressor 100, a discharge pipe 115 that allows the compressed refrigerant to be discharged from the linear compressor 100, and a supplementary pipe 40 for supplementing the refrigerant in the linear compressor 100.

For example, the intake pipe 114 may be coupled to the first shell cover 112. The refrigerant may be sucked into the linear compressor 100 along the axial direction through the intake pipe 114.

The discharge pipe 115 may be coupled to an outer circumferential surface of the shell 111. The refrigerant sucked through the intake pipe 114 may be compressed while flowing in the axial direction. The compressed refrigerant may be discharged through the discharge pipe 115. The discharge pipe 115 may be disposed closer to the second shell cover 113 than to the first shell cover 112.

The supplementary pipe 40 may be coupled to the outer circumferential surface of the shell 111. A worker may inject the refrigerant into the linear compressor 100 through the supplementary pipe 40.

The supplementary pipe 40 may be coupled to the shell 111 at a different height from the discharge pipe 115 in order to prevent interference with the discharge pipe 115. Herein, the height may be understood as a distance measured from the leg 20 in a vertical direction. Because the discharge pipe 115 and the supplementary pipe 40 are coupled to the outer circumferential surface of the shell 111 at different heights, the work convenience can be attained.

On an inner circumferential surface of the shell 111 corresponding to a location at which the supplementary pipe 40 is coupled, at least a portion of the second shell cover 113 may be positioned adjacently. In other words, at least a portion of the second shell cover 113 may act as a resistance of the refrigerant injected through the supplementary pipe 40.

Thus, with respect to a flow path of the refrigerant, a size of the flow path of the refrigerant introduced through the supplementary pipe 40 is configured to decrease by the second shell cover 113 while the refrigerant enters into the inner space of the shell 111, and again increase while the refrigerant passes through the second shell cover 113. In this process, a pressure of the refrigerant may be reduced to vaporize the refrigerant, and an oil contained in the refrigerant may be separated. Thus, while the refrigerant, from which the oil is separated, is introduced into the piston 150, a compression performance of the refrigerant can be improved. The oil may be understood as a working oil present in a cooling system.

Figure 2:
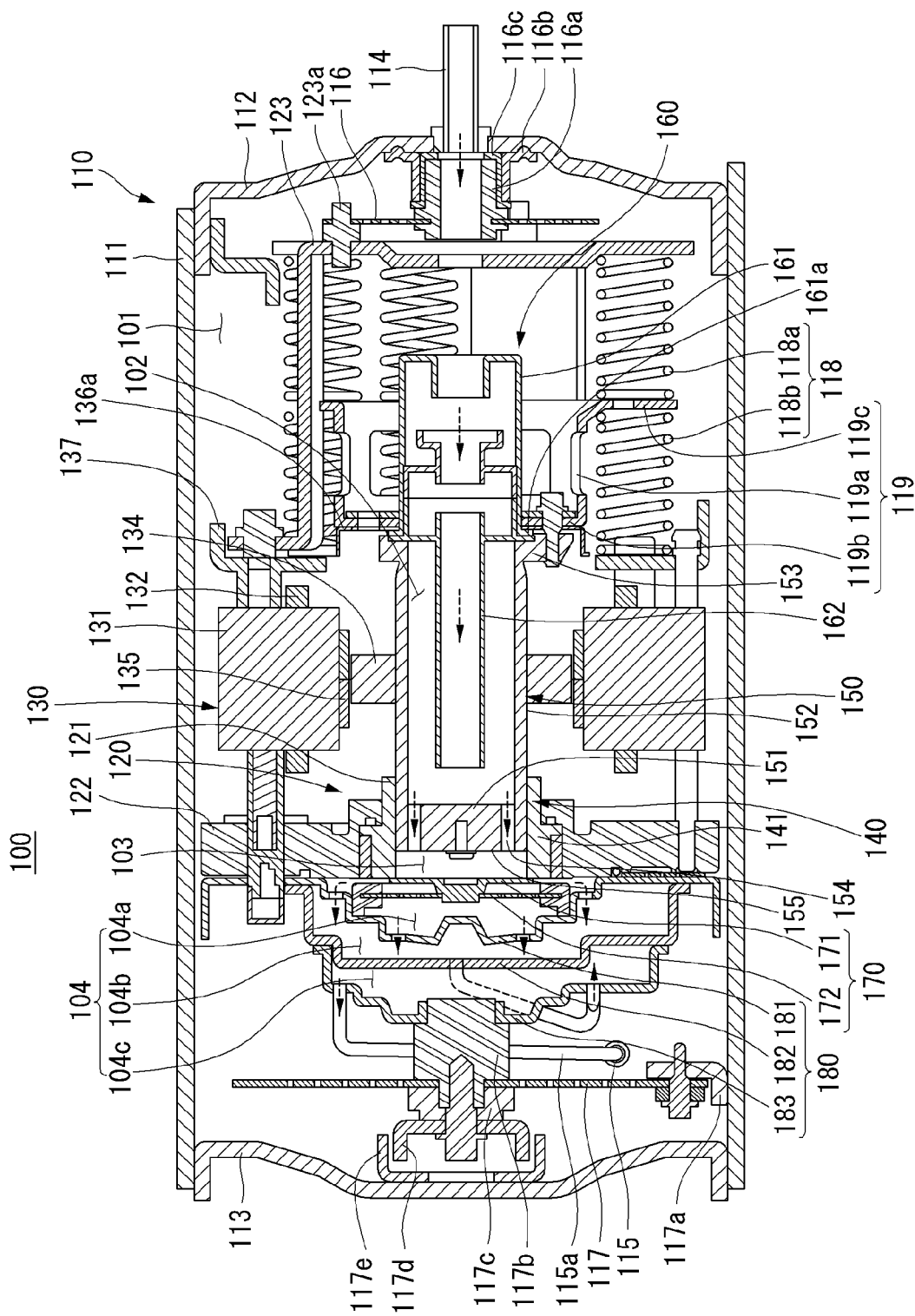
FIG. 2 is a cross-sectional view of a linear compressor according to an embodiment of the present disclosure.

FIG. 2 is a cross-sectional view illustrating a structure of the linear compressor 100.

Hereinafter, the linear compressor 100 according to the present disclosure will be described taking, as an example, a linear compressor that sucks and compresses a fluid while a piston linearly reciprocates, and discharges the compressed fluid.

The linear compressor 100 may be a component of a refrigeration cycle, and the fluid compressed in the linear compressor 100 may be a refrigerant circulating the refrigeration cycle. The refrigeration cycle may include a condenser, an expander, an evaporator, etc., in addition to the compressor. The linear compressor 100 may be used as a component of the cooling system of the refrigerator, but is not limited thereto. The linear compressor can be widely used in the whole industry.

Referring to FIG. 2, the compressor 100 may include a casing 110 and a main body received in the casing 110. The main body of the compressor 100 may include a frame 120, the cylinder 140 fixed to the frame 120, the piston 150 that linearly reciprocates inside the cylinder 140, the drive unit 130 that is fixed to the frame 120 and gives a driving force to the piston 150, and the like. Here, the cylinder 140 and the piston 150 may be referred to as compression units 140 and 150.

The compressor 100 may include a bearing means for reducing a friction between the cylinder 140 and the piston 150. The bearing means may be an oil bearing or a gas bearing. Alternatively, a mechanical bearing may be used as the bearing means.

The main body of the compressor 100 may be elastically supported by support springs 116 and 117 installed at both ends in the casing 110. The support springs 116 and 117 may include a first support spring 116 for supporting the rear of the main body and a second support spring 117 for supporting a front of the main body. The support springs 116 and 117 may include a leaf spring. The support springs 116 and 117 can absorb vibrations and impacts generated by a reciprocating motion of the piston 150 while supporting the internal parts of the main body of the compressor 100.

The casing 110 may define a sealed space. The sealed space may include a receiving space 101 in which the sucked refrigerant is received, an intake space 102 which is filled with the refrigerant before the compression, a compression space 103 in which the refrigerant is compressed, and a discharge space 104 which is filled with the compressed refrigerant.

The refrigerant sucked from the intake pipe 114 connected to the rear side of the casing 110 may be filled in the receiving space 101, and the refrigerant in the intake space 102 communicating with the receiving space 101 may be compressed in the compression space 103, discharged into the discharge space 104, and discharged to the outside through the discharge pipe 115 connected to the front side of the casing 110.

The casing 110 may include the shell 111 formed in a substantially cylindrical shape that is open at both ends and is long in a transverse direction, the first shell cover 112 coupled to the rear side of the shell 111, and the second shell cover 113 coupled to the front side of the shell 111. Here, it can be understood that the front side is the left side of the figure and is a direction in which the compressed refrigerant is discharged, and the rear side is the right side of the figure and is a direction in which the refrigerant is introduced. Further, the first shell cover 112 and the second shell cover 113 may be formed as one body with the shell 11.

The casing 110 may be formed of a thermally conductive material. Hence, heat generated in the inner space of the casing 110 can be quickly dissipated to the outside.

The first shell cover 112 may be coupled to the shell 111 in order to seal the rear of the shell 111, and the intake pipe 114 may be inserted and coupled to the center of the first shell cover 112.

The rear of the main body of the compressor 100 may be elastically supported by the first support spring 116 in the radial direction of the first shell cover 112.

The first support spring 116 may include a circular leaf spring. An edge of the first support spring 116 may be elastically supported by a support bracket 123a in a forward direction with respect to a back cover 123. An opened center portion of the first support spring 116 may be supported by an intake guide 116a in a rearward direction with respect to the first shell cover 112.

The intake guide 116a may have a through passage formed therein. The intake guide 116a may be formed in a cylindrical shape. A front outer circumferential surface of the intake guide 116a may be coupled to a central opening of the first support spring 116, and a rear end of the intake guide 116a may be supported by the first shell cover 112. In this instance, a separate intake support member 116b may be interposed between the intake guide 116a and an inner surface of the first shell cover 112.

A rear side of the intake guide 116a may communicate with the intake pipe 114, and the refrigerant sucked through the intake pipe 114 may pass through the intake guide 116a and may be smoothly introduced into a muffler unit 160 to be described below.

A damping member 116c may be disposed between the intake guide 116a and the intake support member 116b. The damping member 116c may be formed of a rubber material or the like. Hence, a vibration that may occur in the process of sucking the refrigerant through the intake pipe 114 can be prevented from being transmitted to the first shell cover 112.

The second shell cover 113 may be coupled to the shell 111 to seal the front side of the shell 111, and the discharge pipe 115 may be inserted and coupled through a loop pipe 115a. The refrigerant discharged from the compression space 103 may pass through a discharge cover assembly 180 and then may be discharged into the refrigeration cycle through the loop pipe 115a and the discharge pipe 115.

A front side of the main body of the compressor 100 may be elastically supported by the second support spring 117 in the radial direction of the shell 111 or the second shell cover 113.

The second support spring 117 may include a circular leaf spring. An opened center portion of the second support spring 117 may be supported by a first support guide 117b in a rearward direction with respect to the discharge cover assembly 180. An edge of the second support spring 117 may be supported by a support bracket 117a in a forward direction with respect to the inner surface of the shell 111 or the inner circumferential surface of the shell 111 adjacent to the second shell cover 113.

Unlike FIG. 2, the edge of the second support spring 117 may be supported in the forward direction with respect to the inner surface of the shell 111 or the inner circumferential surface of the shell 111 adjacent to the second shell cover 113 through a separate bracket (not shown) coupled to the second shell cover 113.

The first support guide 117b may be formed in a cylindrical shape. A cross section of the first support guide 117 may have a plurality of diameters. A front side of the first support guide 117 may be inserted into a central opening of the second support spring 117, and a rear side of the first support guide 117 may be inserted into a central opening of the discharge cover assembly 180. A support cover 117c may be coupled to the front side of the first support guide 117b with the second support spring 117 interposed therebetween. A cup-shaped second support guide 117d that is recessed rearward may be coupled to the front side of the support cover 117c. A cup-shaped third support guide 117e that corresponds to the second support guide 117d and is recessed forward may be coupled to the inside of the second shell cover 113. The second support guide 117d may be inserted into the third support guide 117e and may be supported in the axial direction and/or the radial direction. In this instance, a gap may be formed between the second support guide 117d and the third support guide 117e.

The frame 120 may include a body portion 121 supporting the outer circumferential surface of the cylinder 140, and a first flange portion 122 that is connected to one side of the body portion 121 and supports the drive unit 130. The frame 120 may be elastically supported with respect to the casing 110 by the first and second support springs 116 and 117 together with the drive unit 130 and the cylinder 140.

The body portion 121 may wrap the outer circumferential surface of the cylinder 140. The body portion 121 may be formed in a cylindrical shape. The first flange portion 122 may extend from a front end of the body portion 121 in the radial direction.

The cylinder 140 may be coupled to an inner circumferential surface of the body portion 121. An inner stator 134 may be coupled to an outer circumferential surface of the body portion 121. For example, the cylinder 140 may be pressed and fitted to the inner circumferential surface of the body portion 121.

An outer stator 131 may be coupled to a rear surface of the first flange portion 122, and the discharge cover assembly 180 may be coupled to a front surface of the first flange portion 122. For example, the outer stator 131 and the discharge cover assembly 180 may be fixed through a mechanical coupling means.

The frame 120 and the cylinder 140 may be formed of aluminum or an aluminum alloy material.

The cylinder 140 may be formed in a cylindrical shape in which both ends are opened. The piston 150 may be inserted through a rear end of the cylinder 140. A front end of the cylinder 140 may be closed via a discharge valve assembly 170. The compression space 103 may be formed between the cylinder 140, a front end of the piston 150, and the discharge valve assembly 170. Here, the front end of the piston 150 may be referred to as a head portion 151. The volume of the compression space 103 increases when the piston 150 moves backward, and decreases as the piston 150 moves forward. That is, the refrigerant introduced into the compression space 103 may be compressed while the piston 150 moves forward, and may be discharged through the discharge valve assembly 170.

The cylinder 140 may include a second flange portion 141 disposed at the front end. The second flange portion 141 may bend to the outside of the cylinder 140. The second flange portion 141 may extend in an outer circumferential direction of the cylinder 140. The second flange portion 141 of the cylinder 140 may be coupled to the frame 120. For example, the front end of the frame 120 may include a flange groove corresponding to the second flange portion 141 of the cylinder 140, and the second flange portion 141 of the cylinder 140 may be inserted into the flange groove and coupled through a coupling member.

A gas bearing means may be provided to supply a discharge gas to a gap between an outer circumferential surface of the piston 150 and the outer circumferential surface of the cylinder 140 and lubricate between the cylinder 140 and the piston 150 with gas. The discharge gas between the cylinder 140 and the piston 150 may provide a levitation force to the piston 150 to reduce a friction generated between the piston 150 and the cylinder 140.

The piston 150 is inserted into the opened rear end of the cylinder 140 and is provided to seal the rear of the compression space 103.

The piston 150 may include a head portion 151 and a guide portion 152. The head portion 151 may be formed in a disc shape. The head portion 151 may be partially open. The head portion 151 may partition the compression space 103. The guide portion 152 may extend rearward from an outer circumferential surface of the head portion 151. The guide portion 152 may be formed in a cylindrical shape. The inside of the guide portion 152 may be empty, and a front of the guide portion 152 may be partially sealed by the head portion 151. A rear of the guide portion 152 may be opened and connected to the muffler unit 160. The head portion 151 may be provided as a separate member coupled to the guide portion 152. Alternatively, the head portion 151 and the guide portion 152 may be formed as one body.

The piston 150 may be connected to the inner stator 134. The inner stator 134 may be disposed on the outer circumferential surface of the piston 150. The inner stator 134 may be disposed on an outer circumferential surface of the guide portion 152 of the piston 150. The inner stator 134 may be fixed and coupled to the outer circumferential surface of the guide portion 152 of the piston 150. The piston 150 may reciprocate in a front-rear direction or the axial direction depending on the movement of the inner stator 134.

The piston 150 may include an intake port 154. The intake port 154 may pass through the head portion 151. The intake port 154 may communicate with the intake space 102 and the compression space 103 inside the piston 150. For example, the refrigerant flowing from the receiving space 101 to the intake space 102 in the piston 150 may pass through the intake port 154 and may be sucked into the compression space 103 between the piston 150 and the cylinder 140.

The intake port 154 may extend in the axial direction of the piston 150. The intake port 154 may be inclined in the axial direction of the piston 150. For example, the intake port 154 may extend to be inclined in a direction away from the central axis as it goes to the rear of the piston 150.

A cross section of the intake port 154 may be formed in a circular shape. The intake port 154 may have a constant inner diameter. In contrast, the intake port 154 may be formed as a long hole in which an opening extends in the radial direction of the head portion 151, or may be formed such that the inner diameter becomes larger as it goes to the rear.

The plurality of intake ports 154 may be formed in at least one of the radial direction and the circumferential direction of the head portion 151.

The head portion 151 of the piston 150 adjacent to the compression space 103 may be equipped with an intake valve 155 for selectively opening and closing the intake port 154. The intake valve 155 may operate by elastic deformation to open or close the intake port 154. That is, the intake valve 155 may be elastically deformed to open the intake port 154 by the pressure of the refrigerant flowing into the compression space 103 through the intake port 154.

The muffler unit 160 may be coupled to the rear of the piston 150 to reduce a noise generated in the process of sucking the refrigerant into the piston 150. The refrigerant sucked through the intake pipe 114 may flow into the intake space 102 in the piston 150 via the muffler unit 160.

The muffler unit 160 may include an intake muffler 161 communicating with the receiving space 101 of the casing 110, and an inner guide 162 that is connected to a front of the intake muffler 161 and guides the refrigerant to the intake port 154.

The intake muffler 161 may be positioned behind the piston 150. A rear opening of the intake muffler 161 may be disposed adjacent to the intake pipe 114, and a front end of the intake muffler 161 may be coupled to the rear of the piston 150. The intake muffler 161 may have a flow path formed in the axial direction to guide the refrigerant in the receiving space 101 to the intake space 102 inside the piston 150.

The inside of the intake muffler 161 may include a plurality of noise spaces partitioned by a baffle. The intake muffler 161 may be formed by combining two or more members. For example, a second intake muffler may be press-coupled to the inside of a first intake muffler to define a plurality of noise spaces. In addition, the intake muffler 161 may be formed of a plastic material in consideration of weight or insulation property.

One side of the inner guide 162 may communicate with the noise space of the intake muffler 161, and other side may be deeply inserted into the piston 150. The inner guide 162 may be formed in a pipe shape. Both ends of the inner guide 162 may have the same inner diameter. The inner guide 162 may be formed in a cylindrical shape. Alternatively, an inner diameter of a front end that is a discharge side of the inner guide 162 may be greater than an inner diameter of a rear end opposite the front end.

The intake muffler 161 and the inner guide 162 may be provided in various shapes and may adjust the pressure of the refrigerant passing through the muffler unit 160. The intake muffler 161 and the inner guide 162 may be formed as one body.

The discharge valve assembly 170 may include a discharge valve 171 and a valve spring 172 that is provided on a front side of the discharge valve 171 to elastically support the discharge valve 171. The discharge valve assembly 170 may selectively discharge the compressed refrigerant in the compression space 103. Here, the compression space 103 means a space between the intake valve 155 and the discharge valve 171.

The discharge valve 171 may be disposed to be supportable on the front surface of the cylinder 140. The discharge valve 171 may selectively open and close the front opening of the cylinder 140. The discharge valve 171 may operate by elastic deformation to open or close the compression space 103. The discharge valve 171 may be elastically deformed to open the compression space 103 by the pressure of the refrigerant flowing into the discharge space 104 through the compression space 103. For example, the compression space 103 may maintain a sealed state while the discharge valve 171 is supported on the front surface of the cylinder 140, and the compressed refrigerant of the compression space 103 may be discharged into an opened space in a state where the discharge valve 171 is spaced apart from the front surface of the cylinder 140.

The valve spring 172 may be provided between the discharge valve 171 and the discharge cover assembly 180 to provide an elastic force in the axial direction. The valve spring 172 may be provided as a compression coil spring, or may be provided as a leaf spring in consideration of an occupied space or reliability.

When the pressure of the compression space 103 is equal to or greater than a discharge pressure, the valve spring 172 may open the discharge valve 171 while deforming forward, and the refrigerant may be discharged from the compression space 103 and discharged into a first discharge space 104a of the discharge cover assembly 180. When the discharge of the refrigerant is completed, the valve spring 172 provides a restoring force to the discharge valve 171 and thus can allow the discharge valve 171 to be closed.

A process of introducing the refrigerant into the compression space 103 through the intake valve 155 and discharging the refrigerant of the compression space 103 into the discharge space 104 through the discharge valve 171 is described as follows.

In the process in which the piston 150 linearly reciprocates in the cylinder 140, when the pressure of the compression space 103 is equal to or less than a predetermined intake pressure, the intake valve 155 is opened and thus the refrigerant is sucked into a compression space 103. On the other hand, when the pressure of the compression space 103 exceeds the predetermined intake pressure, the refrigerant of the compression space 103 is compressed in a state in which the intake valve 155 is closed.

When the pressure of the compression space 103 is equal to or greater than the predetermined intake pressure, the valve spring 172 deforms forward and opens the discharge valve 171 connected to the valve spring 172, and the refrigerant is discharged from the compression space 103 to the discharge space 104 of the discharge cover assembly 180. When the discharge of the refrigerant is completed, the valve spring 172 provides a restoring force to the discharge valve 171 and allows the discharge valve 171 to be closed, thereby sealing a front of the compression space 103.

The discharge cover assembly 180 is installed at the front of the compression space 103, forms a discharge space 104 for receiving the refrigerant discharged from the compression space 103, and is coupled to a front of the frame 120 to thereby reduce a noise generated in the process of discharging the refrigerant from the compression space 103. The discharge cover assembly 180 may be coupled to a front of the first flange portion 122 of the frame 120 while receiving the discharge valve assembly 170. For example, the discharge cover assembly 180 may be coupled to the first flange portion 122 through a mechanical coupling member.

An O-ring may be provided between the discharge cover assembly 180 and the frame 120 to prevent the refrigerant in a gasket for thermal insulation and the discharge space 104 from leaking.

The discharge cover assembly 180 may be formed of a thermally conductive material. Therefore, when a high temperature refrigerant is introduced into the discharge cover assembly 180, heat of the refrigerant may be transferred to the casing 110 through the discharge cover assembly 180 and dissipated to the outside of the compressor.

The discharge cover assembly 180 may include one discharge cover, or may be arranged so that a plurality of discharge covers sequentially communicate with each other. When the discharge cover assembly 180 is provided with the plurality of discharge covers, the discharge space 104 may include a plurality of spaces partitioned by the respective discharge covers. The plurality of spaces may be disposed in a front-rear direction and may communicate with each other.

For example, when there are three discharge covers, the discharge space 104 may include a first discharge space 104a between the frame 120 and a first discharge cover 181 coupled to the front side of the frame 120, a second discharge space 104b between the first discharge cover 181 and a second discharge cover 182 that communicates with the first discharge space 104a and is coupled to a front side of the first discharge cover 181, and a third discharge space 104c between the second discharge cover 182 and a third discharge cover 183 that communicates with the second discharge space 104b and is coupled to a front side of the second discharge cover 182.

The first discharge space 104a may selectively communicate with the compression space 103 by the discharge valve 171, the second discharge space 104b may communicate with the first discharge space 104a, and the third discharge space 104c may communicate with the second discharge space 104b. Hence, as the refrigerant discharged from the compression space 103 sequentially passes through the first discharge space 104a, the second discharge space 104b, and the third discharge space 104c, a discharge noise can be reduced, and the refrigerant can be discharged to the outside of the casing 110 through the loop pipe 115a and the discharge pipe 115 communicating with the third discharge cover 183.

The drive unit 130 may include the outer stator 131 that is disposed between the shell 111 and the frame 120 and is coupled to the frame 120, the coil 132 disposed on the outer stator 131, and the inner stator 134 coupled to the piston 150.

When an electric current is applied to the drive unit 130, a magnetic flux may be formed in the coil 132, and an electromagnetic force may occur by an interaction between the magnetic flux formed in the winding coil of the outer stator 131 and the inner stator 134, that is a magnetic substance, to thereby move the inner stator 134. At the same time as the reciprocating movement of the inner stator 134 in the axial direction, the piston 150 connected to the inner stator 134 may also reciprocate integrally with the inner stator 134 in the axial direction.

The drive unit 130 and the compression units 140 and 150 may be supported by the support springs 116 and 117 and a resonant spring 118 in the axial direction.

The resonant spring 118 amplifies the vibration implemented by the reciprocating motion of the inner stator 134 and the piston 150 and thus can achieve an effective compression of the refrigerant. More specifically, the resonant spring 118 may be adjusted to a frequency corresponding to a natural frequency of the piston 150 and may allow the piston 150 to perform a resonant motion. Further, the resonant spring 118 generates a stable movement of the piston 150 and thus can reduce the generation of vibration and noise.

The resonant spring 118 may be a coil spring extending in the axial direction. Both ends of the resonant spring 118 may be connected to a vibrating body and a fixed body, respectively. For example, one end of the resonant spring 118 may be connected to the piston 150, and the other end may be connected to the back cover 123. Therefore, the resonant spring 118 may be elastically deformed between the vibrating body vibrating at one end and the fixed body fixed to the other end.

A natural frequency of the resonant spring 118 may be designed to match a resonant frequency of the inner stator 134 and the piston 150 during the operation of the compressor 100, thereby amplifying the reciprocating motion of the piston 150. However, because the back cover 123 provided as the fixing body is elastically supported by the first support spring 116 in the casing 110, the back cover 123 may not be strictly fixed.

The resonant spring 118 may include a first resonant spring 118a supported on the rear side and a second resonant spring 118b supported on the front side based on a spring supporter 119.

The spring supporter 119 may include a body portion 119a surrounding the intake muffler 161, a second coupling portion 119b that is bent from a front of the body portion 119a in the inward radial direction, and a support portion 119c that is bent from the rear of the body portion 119a in the outward radial direction.

The second coupling portion 119b of the spring supporter 119 may be supported by the piston 150. An inner diameter of the second coupling portion 119b of the spring supporter 119 may cover an outer diameter of the intake muffler 161. For example, the second coupling portion 119b of the spring supporter 119 and the third flange portion 153 of the piston 150 may be sequentially disposed and then may be integrally coupled through a mechanical member. In this instance, the fourth flange portion 161a of the intake muffler 161 may be interposed and fixed together.

The first resonant spring 118a may be disposed between a front surface of the back cover 123 and a rear surface of the spring supporter 119. The second resonant spring 118b may be disposed between a rear surface of a stator cover 137 and a front surface of the spring supporter 119.

A plurality of first and second resonant springs 118a and 118b may be disposed in the circumferential direction of the central axis. The first resonant springs 118a and the second resonant springs 118b may be disposed parallel to each other in the axial direction, or may be alternately disposed. The first and second resonant springs 118a and 118b may be disposed at regular intervals in the radial direction of the central axis. For example, three first resonant springs 118a and three second resonant springs 118b may be provided and may be disposed at intervals of 120 degrees in the radial direction of the central axis.

The compressor 100 may include a plurality of sealing members that can increase a coupling force between the frame 120 and the components around the frame 120.

For example, the plurality of sealing members may include a first sealing member that is interposed at a portion where the frame 120 and the discharge cover assembly 180 are coupled and is inserted into an installation groove provided at the front end of the frame 120, and a second sealing member that is provided at a portion at which the frame 120 and the cylinder 140 are coupled and is inserted into an installation groove provided at an outer surface of the cylinder 140. The second sealing member can increase a coupling force between the frame 120 and the cylinder 140.

An operation of the linear compressor 100 described above is as follows.

First, when an electric current is applied to the drive unit 130, a magnetic flux may be formed in the outer stator 131 by the electric current flowing in the coil 132. The magnetic flux formed in the outer stator 131 may generate an electromagnetic force, and the inner stator 134 that is a magnetic substance may linearly reciprocate by the generated electromagnetic force. The electromagnetic force may be alternately generated in a direction (forward direction) in which the piston 150 is directed toward a top dead center (TDC) during a compression stroke, and in a direction (rearward direction) in which the piston 150 is directed toward a bottom dead center (BDC) during an intake stroke. That is, the drive unit 130 may generate a thrust which is a force for pushing the inner stator 134 and the piston 150 in a moving direction.

The piston 150 linearly reciprocating inside the cylinder 140 may repeatedly increase or reduce the volume of the compression space 103.

When the piston 150 moves in a direction (rearward direction) of increasing the volume of the compression space 103, a pressure of the compression space 103 may decrease. Hence, the intake valve 155 mounted in front of the piston 150 is opened, and the refrigerant remaining in the intake space 102 may be sucked into the compression space 103 along the intake port 154. The intake stroke may be performed until the piston 150 is positioned in the bottom dead center by maximally increasing the volume of the compression space 103.

The piston 150 reaching the bottom dead center may perform the compression stroke while switching its motion direction and moving in a direction (forward direction) of reducing the volume of the compression space 103. As the pressure of the compression space 103 increases during the compression stroke, the sucked refrigerant may be compressed. When the pressure of the compression space 103 reaches a setting pressure, the discharge valve 171 is pushed out by the pressure of the compression space 103 and is opened from the cylinder 140, and the refrigerant can be discharged into the discharge space 104 through a separation space. The compression stroke can continue while the piston 150 moves to the top dead center at which the volume of the compression space 103 is minimized.

As the intake stroke and the compression stroke of the piston 150 are repeated, the refrigerant introduced into the receiving space 101 inside the compressor 100 through the intake pipe 114 may be introduced into the intake space 102 in the piston 150 by sequentially passing the intake guide 116a, the intake muffler 161, and the inner guide 162, and the refrigerant of the intake space 102 may be introduced into the compression space 103 in the cylinder 140 during the intake stroke of the piston 150. After the refrigerant of the compression space 103 is compressed and discharged into the discharge space 104 during the compression stroke of the piston 150, the refrigerant may be discharged to the outside of the compressor 100 via the loop pipe 115a and the discharge pipe 115.

Figure 3:
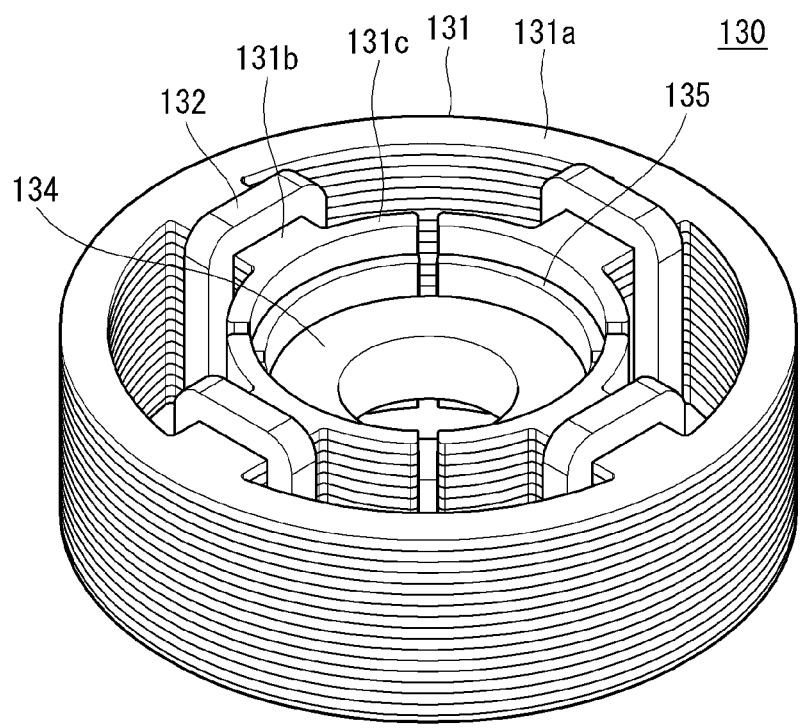
FIG. 3 is a perspective view of a drive unit according to an embodiment of the present disclosure.
Figure 4:
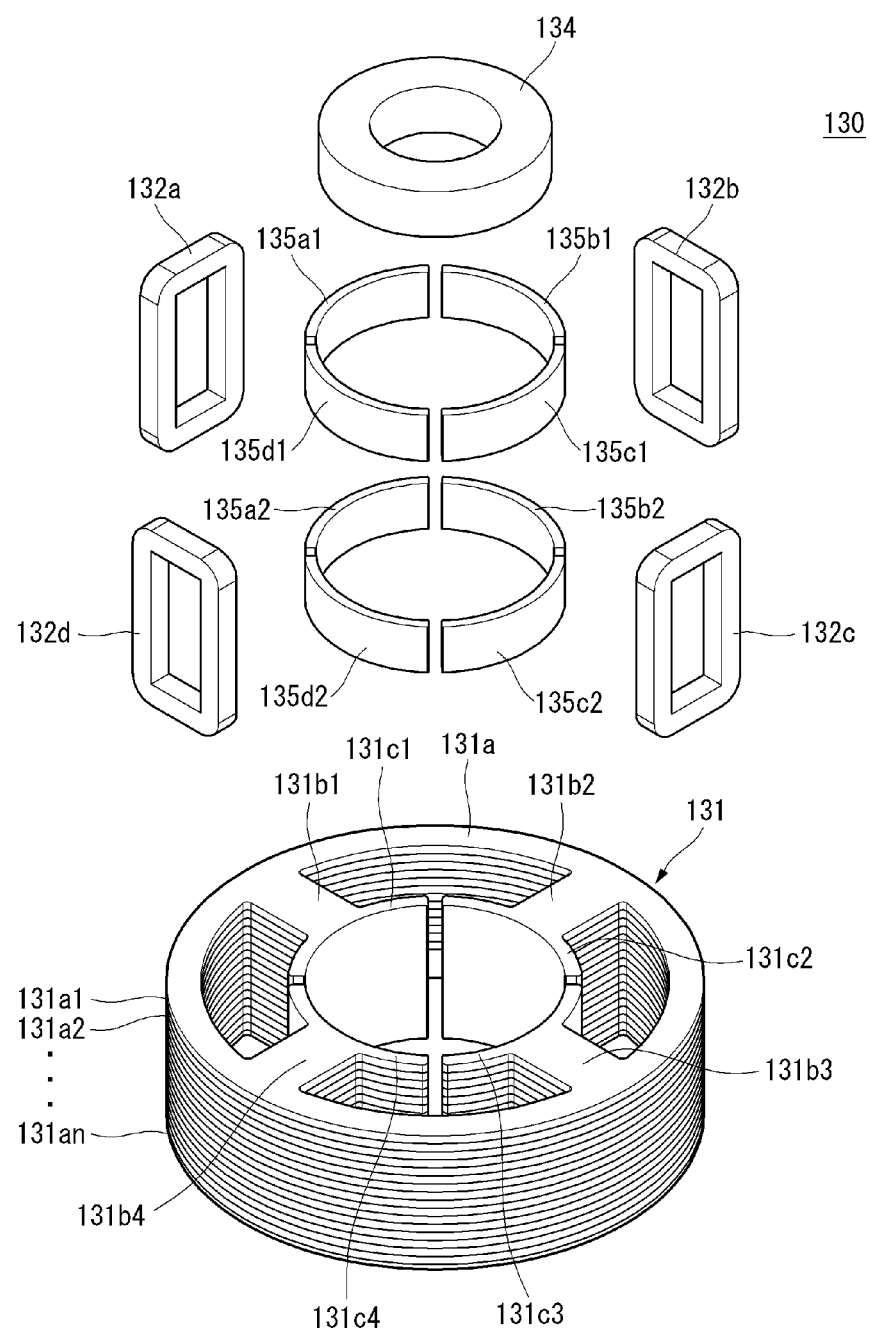
FIG. 4 is an exploded perspective view of a drive unit according to an embodiment of the present disclosure.
Figure 5:
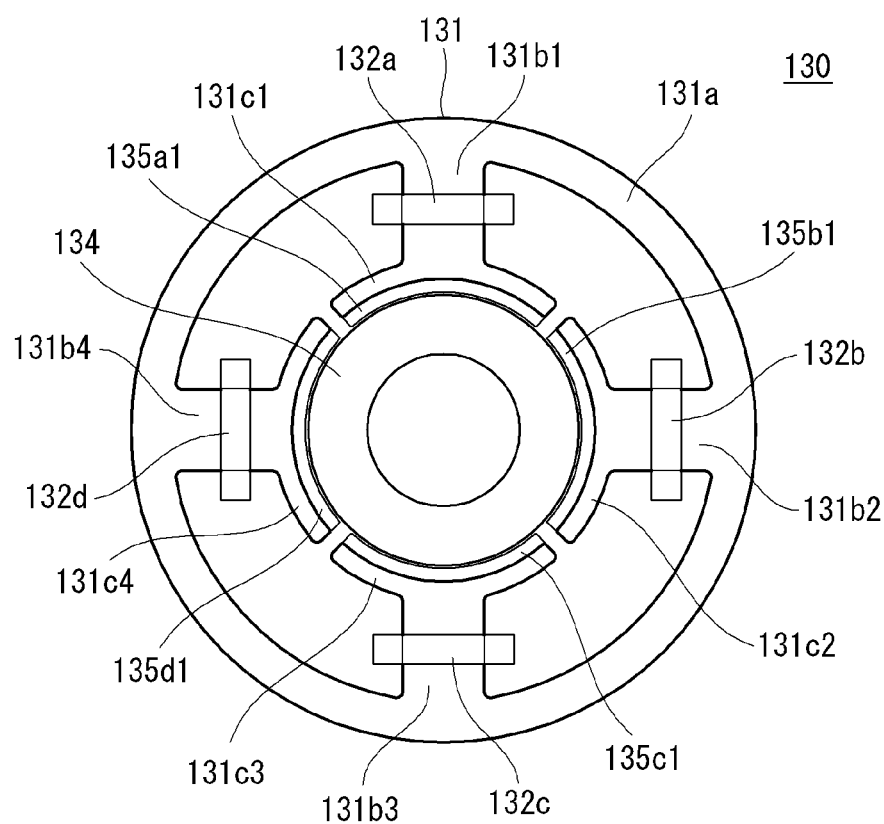
FIG. 5 is a plan view of a drive unit according to an embodiment of the present disclosure.
Figure 6:
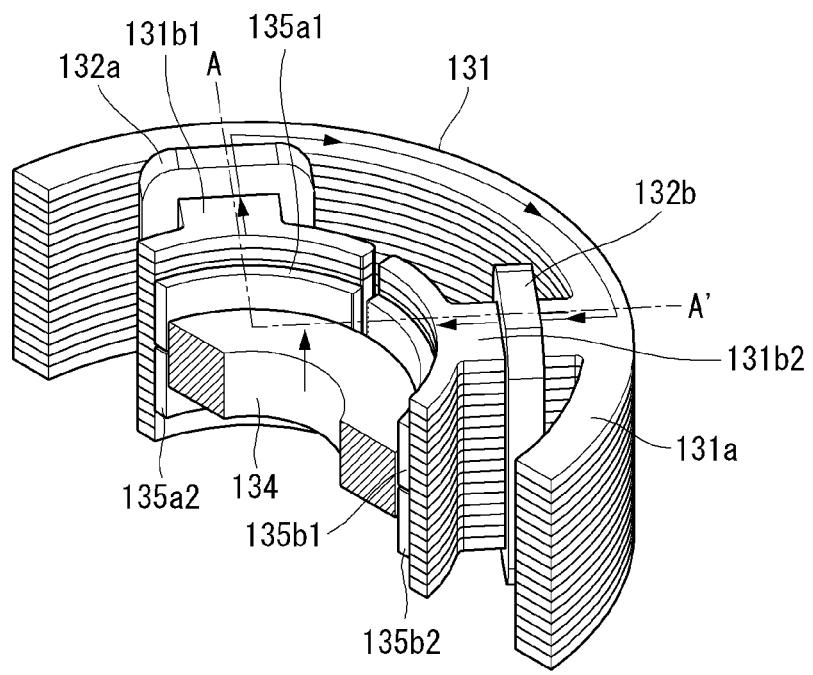
FIG. 6 illustrates a drive unit according to an embodiment of the present disclosure, of which a part is removed.
Figure 7:
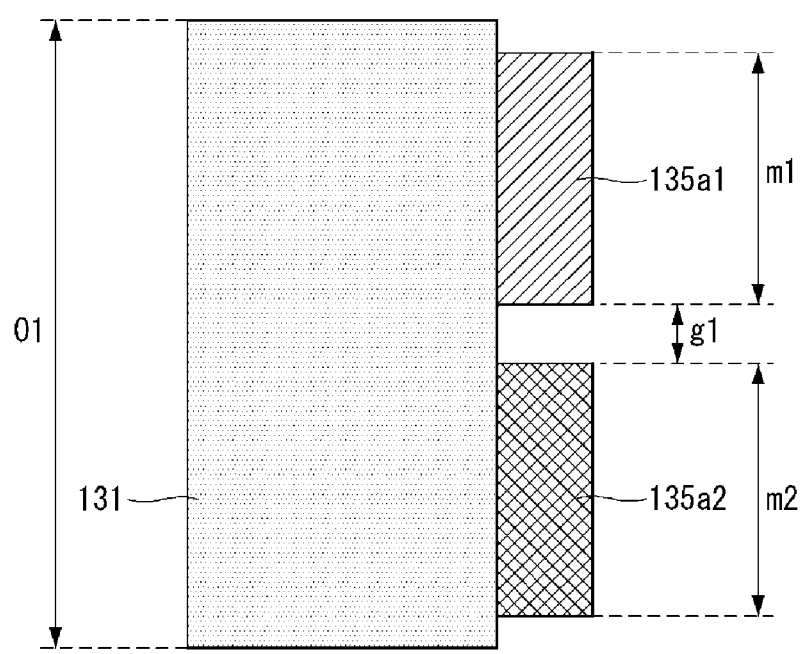
FIG. 7 schematically illustrates a drive unit according to an embodiment of the present disclosure.
Figure 8:
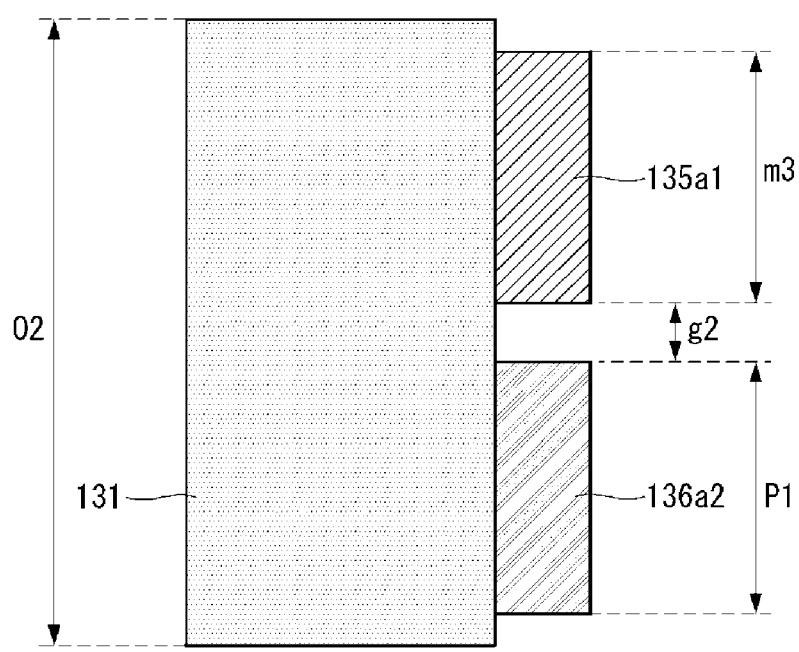
FIG. 8 schematically illustrates a drive unit according to another embodiment of the present disclosure.
Figure 9:
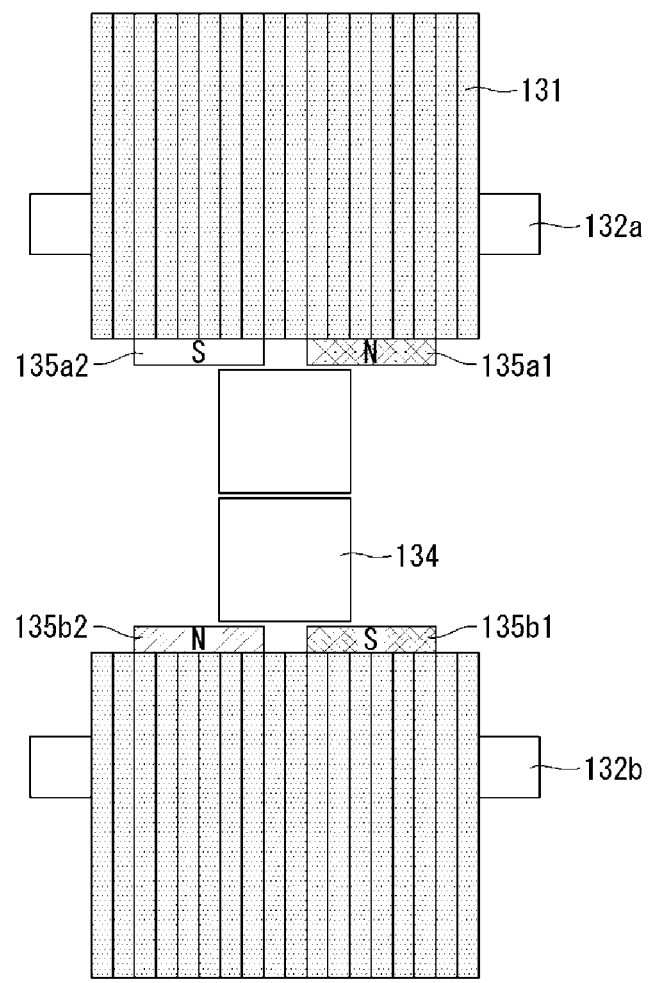
FIGS. 9 to 11 schematically illustrate a cross-sectional view of A-A' of FIG. 6.
Figure 10:
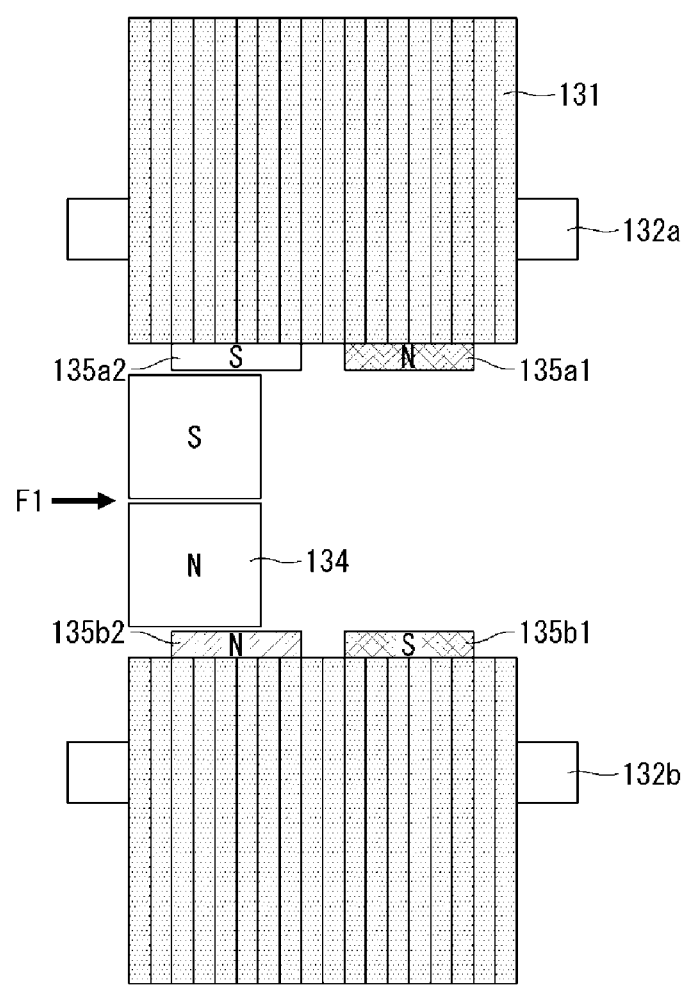
Figure 11:
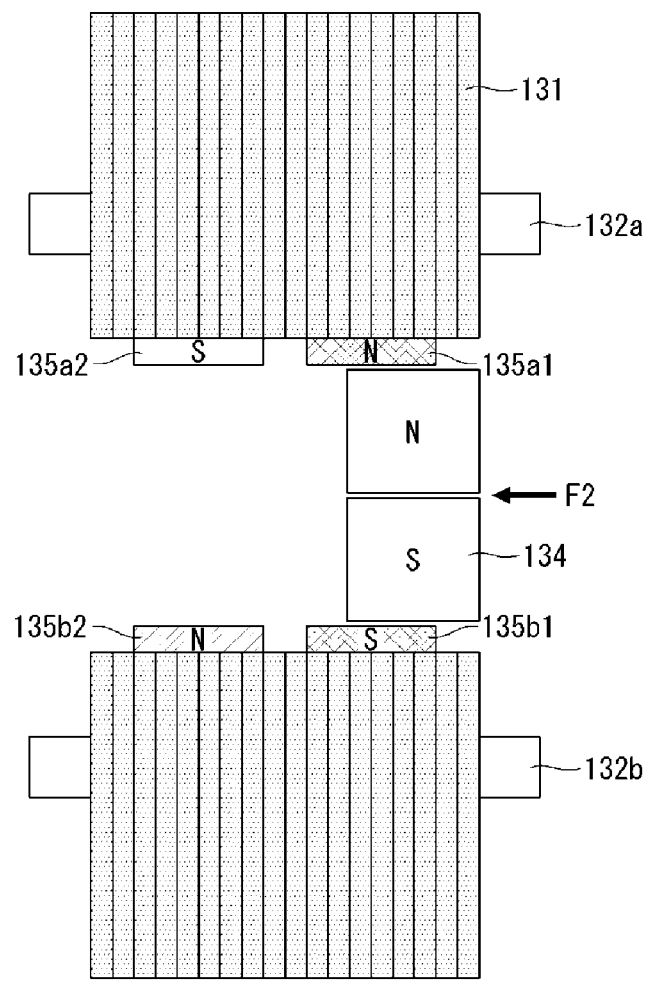

FIG. 3 is a perspective view of a drive unit according to an embodiment of the present disclosure. FIG. 4 is an exploded perspective view of a drive unit according to an embodiment of the present disclosure. FIG. 5 is a plan view of a drive unit according to an embodiment of the present disclosure. FIG. 6 illustrates a drive unit according to an embodiment of the present disclosure, of which a part is removed. FIG. 7 schematically illustrates a drive unit according to an embodiment of the present disclosure. FIG. 8 schematically illustrates a drive unit according to another embodiment of the present disclosure. FIGS. 9 to 11 schematically illustrate a cross-sectional view of A-A' of FIG. 6.

Referring to FIGS. 1 to 11, the linear compressor 100 according to an embodiment of the present disclosure may include the frame 120, the drive unit 130, the cylinder 140, and the piston 150, and does not exclude additional components. The detailed configuration of the linear compressor 100 and the detailed configuration of the frame 120, the drive unit 130, the cylinder 140, and the piston 150, that are not described below, can be understood to be substantially the same as the detailed configuration of the linear compressor 100 and the detailed configuration of the frame 120, the drive unit 130, the cylinder 140, and the piston 150 described with reference to FIG. 2.

The drive unit 130 may be a transverse flux reciprocating motor in which a direction of a magnetic flux and a linear motion direction of the piston 150 form a right angle. In embodiments of the present disclosure, the drive unit 130 may be referred to as the 'transverse flux reciprocating motor'.

The drive unit 130 may include the outer stator 131, the coil 132, the inner stator 134, and a magnet 135.

The outer stator 131 may be coupled to the frame 120. The outer stator 131 may be coupled to the frame 120 through a mechanical means. The outer stator 131 may be connected to the frame 120. The outer stator 131 may be supported by the frame 120. The outer stator 131 may be coupled to the rear of the first flange portion 122 of the frame 120. A front side of the outer stator 131 may be supported by the first flange portion 122 of the frame 120, and a rear side of the outer stator 131 may be supported by the stator cover 137. The stator cover 137 may be formed in a hollow disk shape, wherein the outer stator 131 may be coupled to a front surface of the stator cover 137, and the resonant spring 118 may be supported on a rear surface of the stator cover 137.

The coil 132 may be mounted on the outer stator 131. The coil 132 may be wound on the outer stator 131. The outer stator 131 may be a magnetic substance. When an electric current is applied, a magnetic flux may be formed in the outer stator 131 by the coil 132.

The outer stator 131 may include a stator core 131a, a teeth portion 131b, and a teeth shoe 131c.

The stator core 131a may be coupled to the frame 120. A cross section of the stator core 131a may be formed in a circular shape. The stator core 131a may be formed in a cylindrical shape in which an upper part and a lower part are open. The stator core 131a may be formed in a circular ring shape. The teeth portion 131b may be formed on an inner circumferential surface of the stator core 131a.

The stator core 131a may include a plurality of core plates 131a1, 131a2, . . . , 131an. The plurality of core plates 131a1, 131a2, . . . , 131an may be stacked in the axial direction or the front-rear direction of the linear compressor 100. As the plurality of core plates 131a1, 131a2, . . . , 131an are stacked in the axial direction or the front-rear direction of the linear compressor 100, axial lengths of the stator core 131a and the teeth portion 131b may increase. Hence, an amount of the coil 132 wound on the teeth portion 131b can increase, and thus an outer diameter of the drive unit 130 can decrease. Further, an up-down direction height of the linear compressor 100 can decrease by decreasing the outer diameter of the drive unit 130.

The teeth portion 131b may be extended to the inside of the stator core 131a. The coil 132 may be disposed on the teeth portion 131b. The coil 132 may be wound on the teeth portion 131b. When an electric current is applied to the coil 132, a magnetic flux may be formed in the teeth portion 131b and the stator core 131a by the coil 132. The teeth shoe 131c extending in the circumferential direction may be formed at an inner end of the teeth portion 131b. A cross section of the teeth portion 131b may be a rectangle, but is not limited thereto. For example, polygonal shapes other than the circle or the rectangle may be used.

In the same manner as the stator core 131a, the teeth portion 131b may be configured such that a plurality of teeth portion plates are stacked in the axial direction or the front-rear direction. Through this, an axial length of the teeth portion 131b can increase, and an amount of the coil 132 wound on the teeth portion 131b can increase. As a result, the outer diameter of the drive unit 130 can decrease. In addition, the up-down direction height of the linear compressor 100 can decrease by decreasing the outer diameter of the drive unit 130.

The teeth portion 131b may include a plurality of teeth portions 131b1, 131b2, 131b3 and 131b4. The plurality of teeth portions 131b1, 131b2, 131b3 and 131b4 may be provided as the even number. The plurality of teeth portions 131b1, 131b2, 131b3 and 131b4 may be spaced from each other in the circumferential direction. The plurality of teeth portions 131b1, 131b2, 131b3 and 131b4 may be disposed at positions symmetrical to each other with respect to the center of the outer stator 131. The plurality of teeth portions 131b1, 131b2, 131b3 and 131b4 may be radially disposed about the center of the outer stator 131. The plurality of teeth portions 131b1, 131b2, 131b3 and 131b4 may be disposed at positions symmetrical to each other with respect to the center of the piston 150. Circumferential separation distances and/or angles between the plurality of teeth portions 131b1, 131b2, 131b3 and 131b4 may be substantially the same as each other.

The plurality of teeth portions 131b1, 131b2, 131b3 and 131b4 may include a first teeth portion 131b1, a second teeth portion 131b2 that is spaced from the first teeth portion 131b1 in the circumferential direction, a third teeth portion 131b3 that is spaced from the second teeth portion 131b2 in the circumferential direction, and a fourth teeth portion 131b4 that is spaced from the third teeth portion 131b3 in the circumferential direction. First to fourth coils 132a, 132b, 132c and 132d may be respectively wound on the first to fourth teeth portions 131b1, 131b2, 131b3 and 131b4. Embodiments of the present disclosure describe the four teeth portions 131b1, 131b2, 131b3 and 131b4, by way of example, but are not limited thereto. For example, the number of teeth portions may be variously changed.

The teeth shoe 131c may be extended at the inside of the teeth portion 131b in the circumferential direction. More specifically, the teeth shoe 131c may be extended from an inner end of the teeth portion 131b in the circumferential direction. The teeth shoe 131c may be formed in an arc shape. The teeth shoe 131c may face the inner stator 134. A magnet 135 may be disposed at the teeth shoe 131c. The magnet 135 may be disposed at an inner surface of the teeth shoe 131c.

In the same manner as the stator core 131a, the teeth shoe 131c may be configured such that a plurality of teeth shoe plates are stacked in the axial direction or the front-rear direction. Through this, an axial length of the teeth shoe 131c can increase, and an amount of the coil 132 wound on the teeth shoe 131c can increase. As a result, the outer diameter of the drive unit 130 can decrease. In addition, the up-down direction height of the linear compressor 100 can decrease by decreasing the outer diameter of the drive unit 130.

In embodiments of the present disclosure, each of the plurality of core plates 131a1, 131a2, . . . , 131an, each of the plurality of teeth portion plates, and each of the plurality of teeth shoe plates may be formed integrally.

The teeth shoe 131c may include a plurality of teeth shoes 131c1, 131c2, 131c3 and 131c4. The plurality of teeth shoes 131c1, 131c2, 131c3 and 131c4 may be provided as the even number. The plurality of teeth shoes 131c1, 131c2, 131c3 and 131c4 may be spaced from each other in the circumferential direction. The plurality of teeth shoes 131c1, 131c2, 131c3 and 131c4 may be disposed at positions symmetrical to each other with respect to the center of the outer stator 131. The plurality of teeth shoes 131c1, 131c2, 131c3 and 131c4 may be radially disposed about the center of the outer stator 131. The plurality of teeth shoes 131c1, 131c2, 131c3 and 131c4 may be disposed at positions symmetrical to each other with respect to the center of the piston 150. Circumferential separation distances and/or angles between the plurality of teeth shoes 131c1, 131c2, 131c3 and 131c4 may be substantially the same as each other.

The plurality of teeth shoes 131c1, 131c2, 131c3 and 131c4 may include a first teeth shoe 131c1, a second teeth shoe 131c2 that is spaced from the first teeth shoe 131c1 in the circumferential direction, a third teeth shoe 131c3 that is spaced from the second teeth shoe 131c2 in the circumferential direction, and a fourth teeth shoe 131c4 that is spaced from the third teeth shoe 131c3 in the circumferential direction. The first to fourth teeth shoes 131c1, 131c2, 131c3 and 131c4 may be respectively connected to the first to fourth teeth portions 131b1, 131b2, 131b3 and 131b4. Embodiments of the present disclosure describe the four teeth shoes 131c1, 131c2, 131c3 and 131c4, by way of example, but are not limited thereto. For example, the number of teeth shoes may be variously changed.

The coil 132 may be disposed on the outer stator 131. The coil 132 may be disposed on the teeth portion 131b of the outer stator 131. The coil 132 may be wound on the teeth portion 131b of the outer stator 131. The electric current may be supplied to the coil 132. A cross section of the coil 132 may be formed in a circular shape or a polygonal shape. For example, the cross section of the coil 132 may have a hexagonal shape.

The coil 132 may include a plurality of coils 132a, 132b, 132c and 132d. The plurality of coils 132a, 132b, 132c and 132d may be respectively wound on the plurality of teeth portions 131b1, 131b2, 131b3 and 131b4. The plurality of coils 132a, 132b, 132c and 132d may be provided as the even number. The plurality of coils 132a, 132b, 132c and 132d may be spaced from each other in the circumferential direction. The plurality of coils 132a, 132b, 132c and 132d may be disposed at positions symmetrical to each other with respect to the center of the outer stator 131. The plurality of coils 132a, 132b, 132c and 132d may be radially disposed about the center of the outer stator 131. The plurality of coils 132a, 132b, 132c and 132d may be disposed at positions symmetrical to each other with respect to the center of the piston 150. Circumferential separation distances and/or angles between the plurality of coils 132a, 132b, 132c and 132d may be substantially the same as each other. Each of the plurality of coils 132a, 132b, 132c and 132d may form a magnetic flux in the opposite direction to the coils that are adjacent to each coil in the circumferential direction.

The plurality of coils 132a, 132b, 132c and 132d may include a first coil 132a, a second coil 132b that is spaced from the first coil 132a in the circumferential direction, a third coil 132c that is spaced from the second coil 132b in the circumferential direction, and a fourth coil 132d that is spaced from the third teeth shoe 131c3 in the circumferential direction. The first to fourth coils 132a, 132b, 132c and 132d may be respectively wound on the first to fourth teeth portions 131b1, 131b2, 131b3 and 131b4. The first coil 132a and the third coil 132c may be wound in the same direction. The first coil 132a and the third coil 132c may form a magnetic flux in the same direction. The first coil 132a may be wound in a different direction from the second coil 132b and the fourth coil 132d that are adjacent to the first coil 132a. The first coil 132a may form a magnetic flux in a different direction from the second coil 132b and the fourth coil 132d that are adjacent to the first coil 132a.

As illustrated in FIG. 6, when an electric current flows in the first coil 132a and the second coil 132b, a magnetic flux may be formed in a direction sequentially passing through the first teeth portion 131b1, the stator core 131a, and the second teeth portion 131b2. In this case, the inner stator 134 may move to the front. The front may mean an upward direction based on FIG. 6.

When the electric current flows in the opposite direction to the above direction, a magnetic flux may be formed in a direction sequentially passing through the second teeth portion 131b2, the stator core 131a, and the first teeth portion 131b1. In this case, the inner stator 134 may move to the rear. The rear may mean a downward direction based on FIG. 6.

Embodiments of the present disclosure describe the four coils 132a, 132b, 132c and 132d, by way of example, but are not limited thereto. For example, the number of coils may be variously changed.

The inner stator 134 may be disposed in the outer stator 131. The inner stator 134 may be disposed on the outer circumferential surface of the piston 150. The inner stator 134 may be coupled to the outer circumferential surface of the piston 150. The inner stator 134 may be formed in a circular ring shape. The inner stator 134 may be formed in a cylindrical shape in which an upper part and a lower part are opened.

The inner stator 134 may be a magnetic substance. The inner stator 134 may reciprocate in the axial direction due to an electromagnetic interaction with the coil 132. Specifically, when an electric current is applied to the coil 132, a magnetic flux may be formed in the outer stator 131, and hence, the inner stator 134 may reciprocate in the axial direction. In embodiments of the present disclosure, the axial direction may mean a direction in which the piston moves based on FIG. 2, and mean an up-down direction based on FIG. 6.

The inner stator 134 may face the magnet 135. An axial length of the inner stator 134 may correspond to an axial length of first magnets 135a1, 135b2, 135c1 and 135d2 or second magnets 135a2, 135b1, 135c2 and 135d1. The inner stator 134 may return to its original position by the magnet 135 as illustrated in FIG. 9. This is described in detail below.

The magnet 135 may be disposed on the outer stator 131. The magnet 135 may be disposed on the teeth shoe 131c of the outer stator 131. The magnet 135 may be disposed on an inner surface of the teeth shoe 131c of the outer stator 131. The magnet 135 may face the inner stator 134.

The magnet 135 may include a plurality of magnets 135a1, 135b1, 135c1, 135d1, 135a2, 135b2, 135c2 and 135d2 that are spaced from each other in the axial direction and/or the circumferential direction. Each of the plurality of magnets 135a1, 135b1, 135c1, 135d1, 135a2, 135b2, 135c2 and 135d2 may have a different magnetic pole from magnets that are adjacent to each magnet in the circumferential direction. Each of the plurality of magnets 135a1, 135b1, 135c1, 135d1, 135a2, 135b2, 135c2 and 135d2 may have a different magnetic pole from magnets that are adjacent to each magnet in the axial direction.

The magnet 135 may include the first magnets 135a1, 135b2, 135c1 and 135d2 disposed on the teeth shoe 131c, and the second magnets 135a2, 135b1, 135c2 and 135d1 that are spaced from the first magnets 135a1, 135b2, 135c1 and 135d2 in the axial direction. The first magnets 135a1, 135b2, 135c1 and 135d2 and the second magnets 135a2, 135b1, 135c2 and 135d1 may have different polarities. Hence, an amount of the coil 132 can increase while even using the margent 135 of the same amount as the motor of the related art linear compressor. As a result, the outer diameter of the drive unit 130 can decrease, and the up-down direction height of the linear compressor 100 can decrease by decreasing the outer diameter of the drive unit 130. The axial length of the first magnets 135a1, 135b2, 135c1 and 135d2 may correspond to the axial length of the inner stator 134. The axial length of the second magnets 135a2, 135b1, 135c2 and 135d1 may correspond to the axial length of the inner stator 134.

The first magnets 135a1, 135b2, 135c1 and 135d2 may include a plurality of first magnets. The plurality of first magnets may be provided as the even number. The plurality of first magnets may be disposed at positions symmetrical to each other with respect to the center area of the outer stator 131. The plurality of first magnets may be disposed at positions symmetrical to each other with respect to the center area of the inner stator 134. The plurality of first magnets may be radially disposed about the center area of the inner stator 134. The plurality of first magnets may be disposed at positions symmetrical to each other with respect to the center area of the piston 150.

More specifically, the plurality of first magnets may include a first magnet unit 135a1 disposed in a front area of the first teeth shoe 131c1, a second magnet unit 135b2 disposed in a rear area of the second teeth shoe 131c2, a third magnet unit 135c1 disposed in a front area of the third teeth shoe 131c3, and a fourth magnet unit 135d2 disposed in a rear area of the fourth teeth shoe 131c4.

Embodiments of the present disclosure describe the four first magnets, by way of example, but are not limited thereto. For example, the number of first magnets may be variously changed.

The second magnets 135a2, 135b1, 135c2 and 135d1 may include a plurality of second magnets. The plurality of second magnets may be provided as the even number. The plurality of second magnets may be disposed at positions symmetrical to each other with respect to the center area of the outer stator 131. The plurality of second magnets may be radially disposed about the center area of the outer stator 131. The plurality of second magnets may be disposed at positions symmetrical to each other with respect to the center area of the inner stator 134. The plurality of second magnets may be disposed at positions symmetrical to each other with respect to the center area of the piston 150.

More specifically, the plurality of second magnets may include a fifth magnet unit 135a2 disposed in a rear area of the first teeth shoe 131c1, a sixth magnet unit 135b1 disposed in a front area of the second teeth shoe 131c2, a seventh magnet unit 135c2 disposed in a rear area of the third teeth shoe 131c3, and an eighth magnet unit 135d1 disposed in a front area of the fourth teeth shoe 131c4.

Embodiments of the present disclosure describe the four second magnets, by way of example, but are not limited thereto. For example, the number of second magnets may be variously changed.

Referring to FIG. 7, an axial length O1 of the outer stator 131 may be greater than a sum of an axial length m1 of the first magnets 135a1, 135b2, 135c1 and 135d2, an axial length m2 of the second magnets 135a2, 135b1, 135c2 and 135d1, and an axial separation distance g1 between the first magnets 135a1, 135b2, 135c1 and 135d2 and the second magnets 135a2, 135b1, 135c2 and 135d1.

Hence, an amount of the coil 132 can increase while even using the margent 135 of the same amount as the motor of the related art linear compressor. As a result, the outer diameter of the drive unit 130 can decrease, and the up-down direction height of the linear compressor 100 can decrease by decreasing the outer diameter of the drive unit 130.

Referring to FIG. 8, the second magnets 135a2, 135b1, 135c2 and 135d1 may be replaced by a virtual pole 136a2. The virtual pole 136a2 may be a magnetic substance. In some examples, an axial length O2 of the outer stator 131 may be greater than a sum of an axial length m3 of the first magnets 135a1, 135b2, 135c1 and 135d2, an axial length P1 of the virtual pole 136a2, and an axial separation distance g2 between the first magnets 135a1, 135b2, 135c1 and 135d2 and the virtual pole 136a2. Hence, the implementation of FIG. 8 can reduce the cost while achieving the same effect as the drive unit 130 according to an embodiment of the present disclosure.

The virtual pole may refer to a component of the stator core in examples where the component does not have a polarity from the beginning of operation of the motor, but the polarity is created by a magnet. In some examples, the virtual pole may be referred to as a "stator core pole" as a component of the stator core.

Referring to FIGS. 6 and 9, the first magnet unit 135a1 may have a different polarity from the sixth magnet unit 135b1 and the fifth magnet unit 135a2 and may have the same polarity as the second magnet unit 135b2. For example, the first magnet unit 135a1 may have an N pole, the sixth magnet unit 135b1 may have an S pole, the fifth magnet unit 135a2 may have an S pole, and the second magnet unit 135b2 may have an N pole.

Referring to FIG. 10, when the electric current is supplied to the coil 132 and a magnetic flux is formed in the outer stator 131 in one direction, the inner stator 134 moves to the left side based on FIG. 10. In this case, one region of the inner stator 134 facing the first and fifth magnet units 135a1 and 135a2 has an S pole, and other region of the inner stator 134 facing the second and sixth magnet units 135b1 and 135b2 has an N pole. That is, a reciprocating centering force F1 that allows magnetic energy (i.e., magnetic potential energy or magnetic resistance) to return in the lower direction, i.e., the right direction of FIG. 10 may act between the inner stator 134 and the magnet 135. The reciprocating centering force F1 may return the inner stator 134 to the center area of the outer stator 131.

Referring to FIG. 11, when the electric current is supplied to the coil 132 and a magnetic flux is formed in the outer stator 131 in other direction, the inner stator 134 moves to the right side based on FIG. 10. In this case, one region of the inner stator 134 facing the first and fifth magnet units 135a1 and 135a2 has an N pole, and other region of the inner stator 134 facing the second and sixth magnet units 135b1 and 135b2 has an S pole. That is, a reciprocating centering force F2 that allows magnetic energy (i.e., magnetic potential energy or magnetic resistance) to return in the lower direction, i.e., the left direction of FIG. 11 may act between the inner stator 134 and the magnet 135. The reciprocating centering force F2 may return the inner stator 134 to the center area of the outer stator 131.

That is, when the inner stator 134 moves in a direction far from the center area of the outer stator 131, a reciprocating centering force F2 that allows the inner stator 134 to return to the center area of the outer stator 131 acts due to a magnetic force of the magnet 135. This force may be referred to as a magnetic resonance spring. The inner stator 134 and the piston 150 may perform a resonance motion by the magnetic resonance spring. In this case, the linear compressor 100 according to an embodiment of the present disclosure may be implemented except the resonant spring 118. Hence, the present disclosure can solve a limitation on a mechanical stress limit and a vibration distance by reducing a mechanical resonance spring, and can reduce a friction loss between the inner stator 134 and the outer stator 131 that is generated because the piston 105 is eccentric by a side force.

Figure 12:
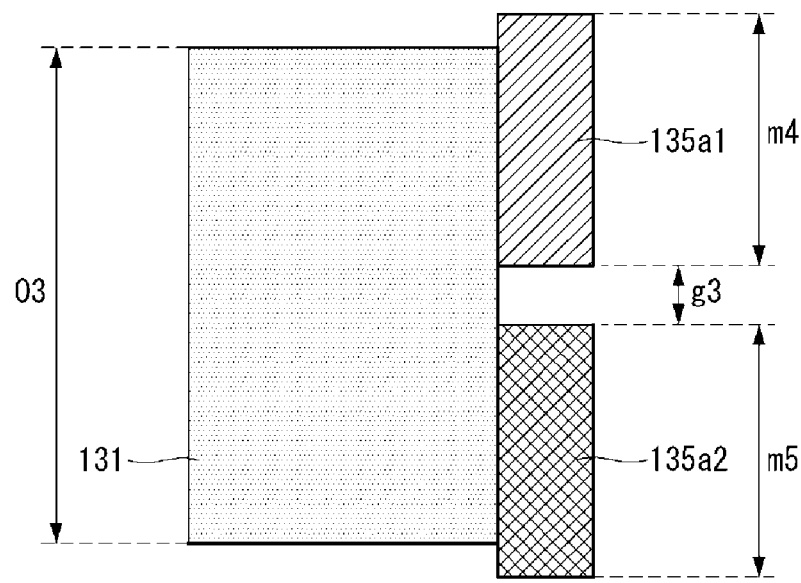
FIG. 12 schematically illustrates a drive unit according to an embodiment of the present disclosure.
Figure 13:
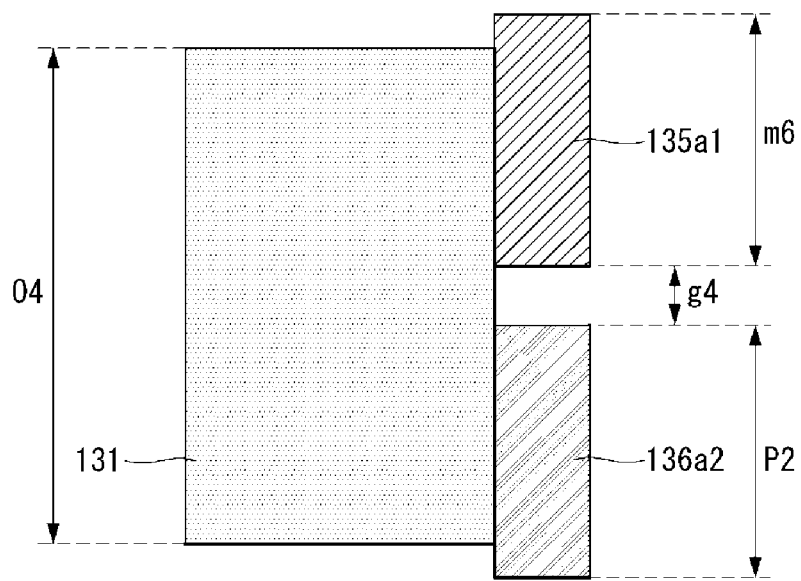
FIG. 13 schematically illustrates a drive unit according to another embodiment of the present disclosure.

FIG. 12 schematically illustrates a drive unit according to an embodiment of the present disclosure. FIG. 13 schematically illustrates a drive unit according to another embodiment of the present disclosure.

Referring to FIG. 12, an axial length O3 of the outer stator 131 may be less than a sum of an axial length m4 of the first magnets 135a1, 135b2, 135c1 and 135d2, an axial length m5 of the second magnets 135a2, 135b1, 135c2 and 135d1, and an axial separation distance g3 between the first magnets 135a1, 135b2, 135c1 and 135d2 and the second magnets 135a2, 135b1, 135c2 and 135d1. The present disclosure can reduce the same loss while reducing the outer diameter of the drive unit 130 by increasing an amount of the coil 132.

Referring to FIG. 13, the second magnets 135a2, 135b1, 135c2 and 135d1 may be replaced by a virtual pole 136a2. The virtual pole 136a2 may be a magnetic substance. In this case, an axial length O4 of the outer stator 131 may be less than a sum of an axial length m6 of the first magnets 135a1, 135b2, 135c1 and 135d2, an axial length P2 of the virtual pole 136a2, and an axial separation distance g4 between the first magnets 135a1, 135b2, 135c1 and 135d2 and the virtual pole 136a2. Hence, the implementation of FIG. 13 can reduce the cost while achieving the same effect as the drive unit 130 described with reference to FIG. 12.

Figure 14:
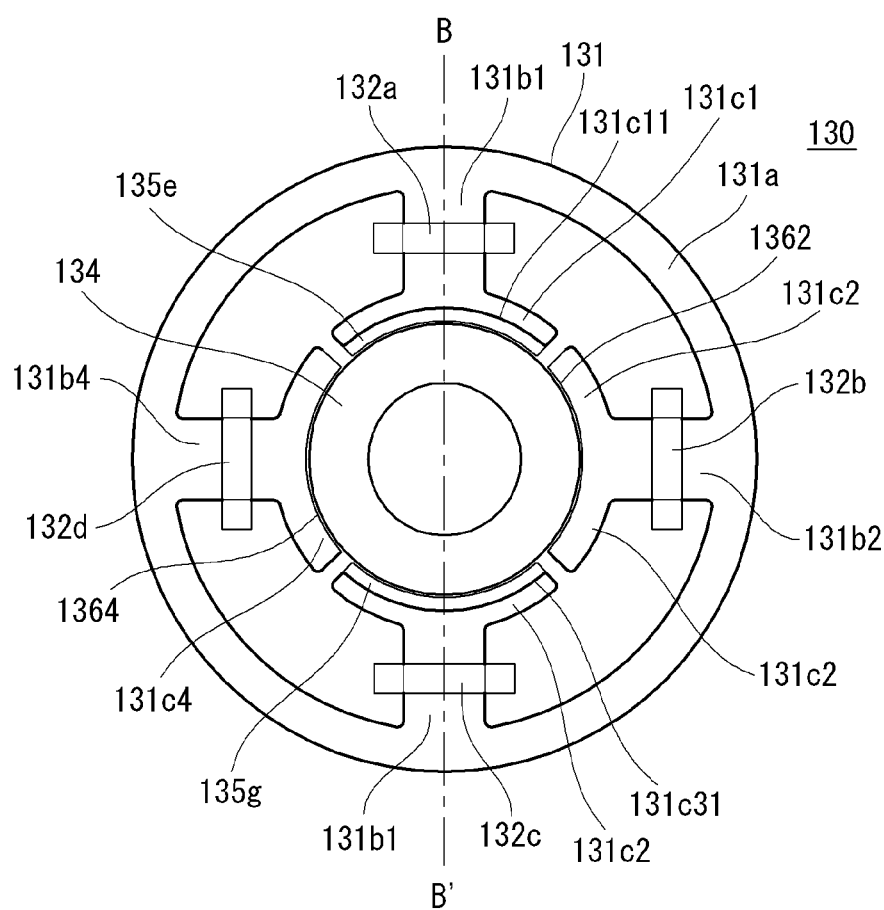
FIG. 14 is a plan view of a drive unit according to yet another embodiment of the present disclosure.
Figure 15:
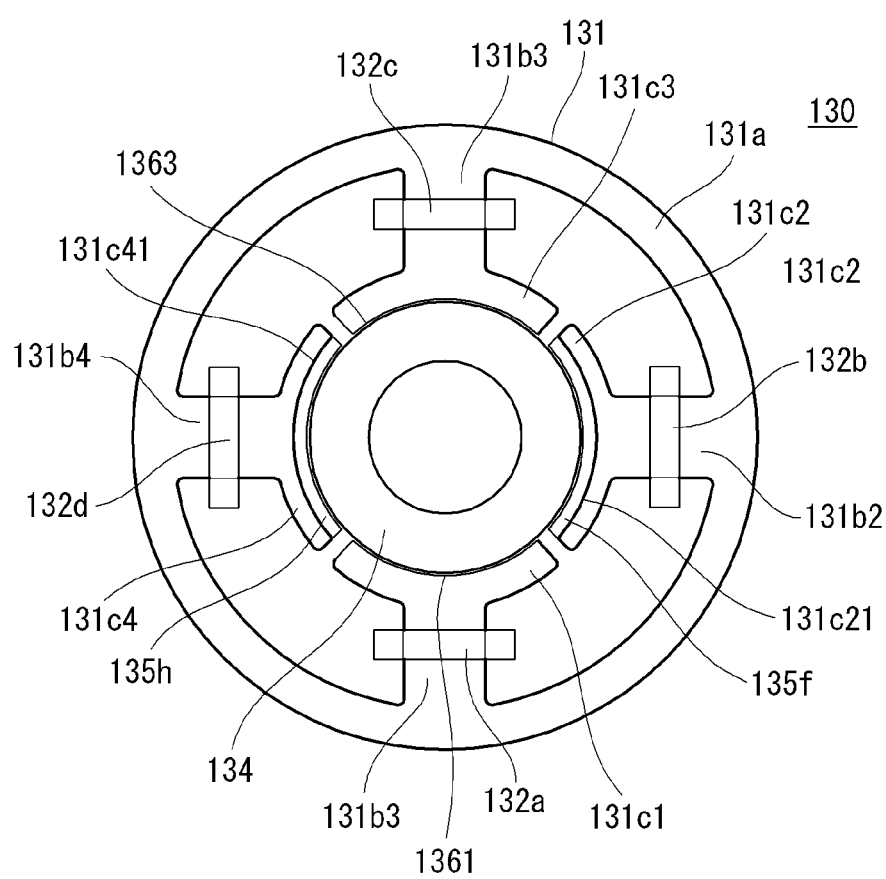
FIG. 15 is a bottom view of a drive unit according to yet another embodiment of the present disclosure.
Figure 16:
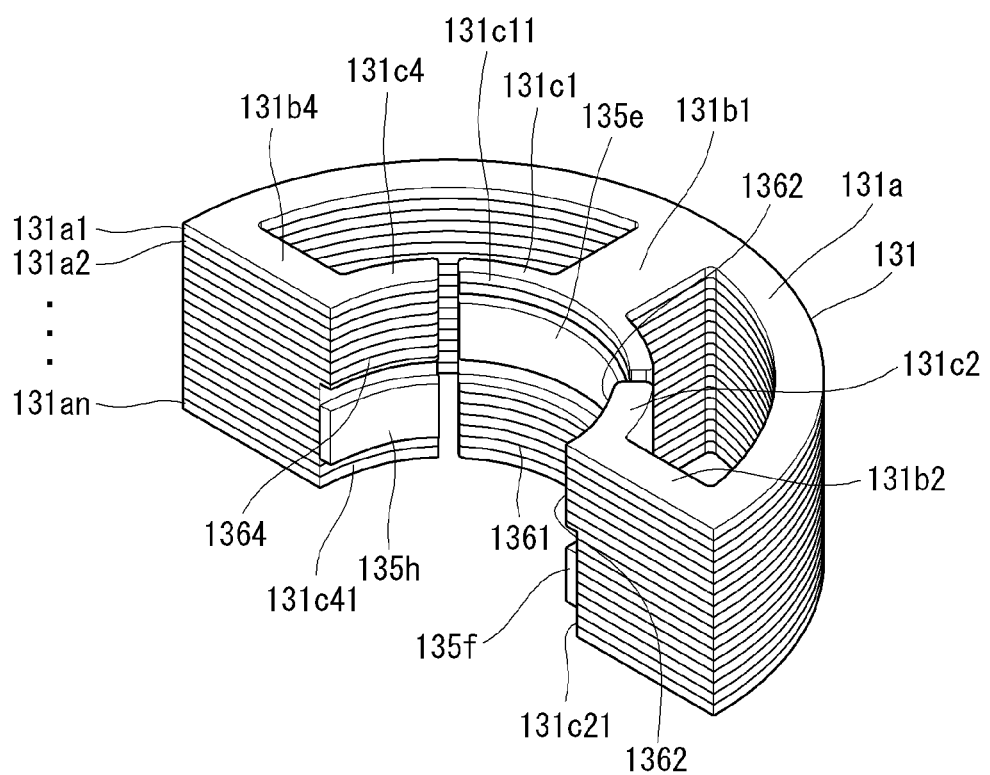
FIG. 16 illustrates a drive unit according to yet another embodiment of the present disclosure, of which a part is removed.
Figure 17:
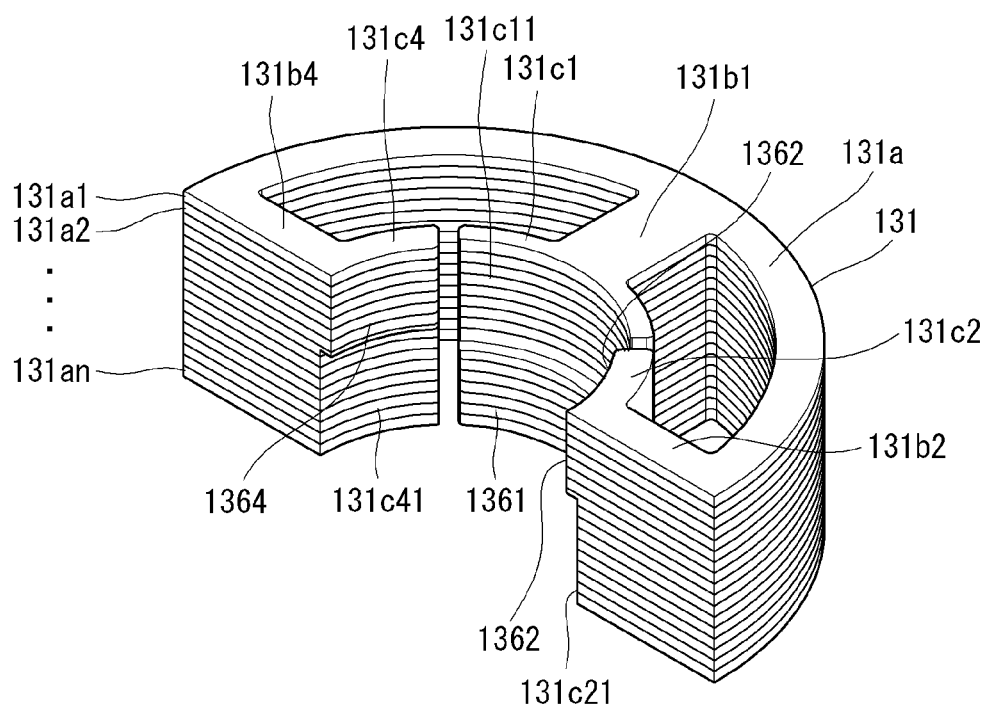
FIG. 17 illustrates that a magnet is removed from the drive unit of FIG. 16.
Figure 18:
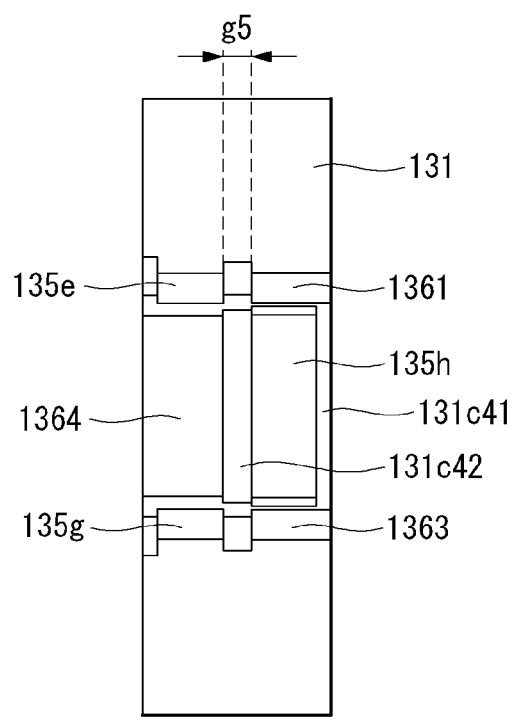
FIG. 18 is a cross-sectional view of a drive unit according to yet another embodiment of the present disclosure.

FIG. 14 is a plan view of a drive unit according to yet another embodiment of the present disclosure. FIG. 15 is a bottom view of a drive unit according to yet another embodiment of the present disclosure. FIG. 16 illustrates a drive unit according to yet another embodiment of the present disclosure, of which a part is removed. FIG. 17 illustrates that a magnet is removed from the drive unit of FIG. 16. FIG. 18 is a cross-sectional view of a drive unit according to yet another embodiment of the present disclosure.

Referring to FIGS. 14 to 18, first magnets 135e, 135f, 135g and 135h of a drive unit 130 according to yet another embodiment of the present disclosure can be understood to be substantially the same as the first magnets 135a1, 135b2, 135c1 and 135d2 described above. In this case, the second magnets 135a2, 135b1, 135c2 and 135d1 of the linear compressor 100 according to an embodiment of the present disclosure may be substituted with virtual poles 1361, 1362, 1363 and 1364.

The virtual poles 1361, 1362, 1363 and 1364 may be formed integrally with a teeth shoe 131c. More specifically, the first virtual pole 1361 may be formed integrally with an inner surface 131c11 of a first teeth shoe 131c1 in a front area of the inner surface 131c11 of the first teeth shoe 131c1. The second virtual pole 1362 may be formed integrally with an inner surface 131c21 of a second teeth shoe 131c2 in a rear area of the inner surface 131c21 of the second teeth shoe 131c2. The third virtual pole 1363 may be formed integrally with an inner surface 131c31 of a third teeth shoe 131c3 in a front area of the inner surface 131c31 of the third teeth shoe 131c3. The fourth virtual pole 1364 may be formed integrally with an inner surface 131c41 of a fourth teeth shoe 131c4 in a rear area of the inner surface 131c41 of the fourth teeth shoe 131c4. In this case, the virtual poles 1361, 1362, 1363 and 1364 may be a magnetic substance and may be understood as one component of an outer stator 131.

An axial length of the virtual poles 1361, 1362, 1363 and 1364 may be greater than an axial length of the first magnets 135e, 135f, 135g and 135h. The axial length of the first magnets 135e, 135f, 135g and 135h may correspond to an axial length of an inner stator 134. The axial length of the virtual poles 1361, 1362, 1363 and 1364 may be greater than the axial length of the inner stator 134.

A separation distance g5 may be formed between the virtual poles 1361, 1362, 1363 and 1364 and the first magnets 135e, 135f, 135g and 135h. Hence, the cost of the product can be reduced using a less amount of magnet 135 than the motor of the related art linear compressor.

Figure 19:
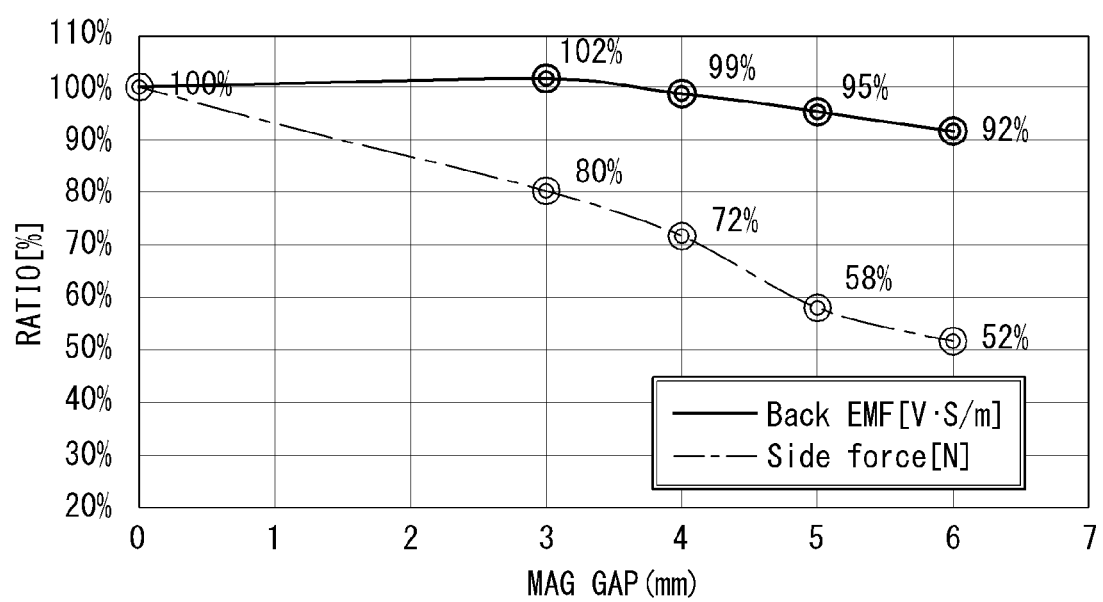
FIG. 19 is a graph illustrating a back electromotive force (EMF) and a side force depending on a separation distance in accordance with embodiments of the present disclosure.

FIG. 19 is a graph illustrating a back electromotive force (EMF) and a side force depending on a separation distance in accordance with embodiments of the present disclosure.

Referring to FIG. 19, when a separation distance is formed between the first magnets 135a1, 135b2, 135c1 and 135d2 and the second magnets 135a2, 135b1, 135c2 and 135d1, a back electromotive force is similar compared to when there is no separation distance, but a side force is reduced compared to when there is no separation distance. Thus, the drive unit 130 of the linear compressor 100 according to embodiments of the present disclosure can reduce a friction loss between the inner stator 134 and the outer stator 131 that is generated because the piston 105 is eccentric by the side force.

Preferably, the separation distance between the first magnets 135a1, 135b2, 135c1 and 135d2 and the second magnets 135a2, 135b1, 135c2 and 135d1 may be between 3 mm and 6 mm. In this case, the back electromotive force is similar to the existing one, and the side force can be remarkably reduced compared to the existing one. More preferably, the separation distance between the first magnets 135a1, 135b2, 135c1 and 135d2 and the second magnets 135a2, 135b1, 135c2 and 135d1 may be 5 mm.

Some embodiments or other embodiments of the present disclosure described above are not exclusive or distinct from each other. Some embodiments or other embodiments of the present disclosure described above can be used together or combined in configuration or function.

For example, configuration "A" described in an embodiment and/or the drawings and configuration "B" described in another embodiment and/or the drawings can be combined with each other. That is, even if the combination between the configurations is not directly described, the combination is possible except in cases where it is described that it is impossible to combine.

The above detailed description is merely an example and is not to be considered as limiting the present disclosure. The scope of the present disclosure should be determined by rational interpretation of the appended claims, and all variations within the equivalent scope of the present disclosure are included in the scope of the present disclosure.

What is claimed is:

1. A transverse flux reciprocating motor comprising:
   an outer stator comprising:
      a stator core comprising a plurality of core plates stacked in an axial direction,
      a teeth portion that extends from the stator core to an inside of the stator core, and
      a teeth shoe that extends from an inner end of the teeth portion in a circumferential direction of the stator core;
   a coil disposed at the teeth portion;
   an inner stator disposed in the outer stator and configured to reciprocate relative to the outer stator in the axial direction based on electromagnetic interaction with the coil; and
   a magnet that is disposed at the teeth shoe and faces the inner stator, the magnet comprising a first magnet and a second magnet that are spaced apart from each other in the axial direction,
   wherein the first magnet comprises a plurality of first magnets that are spaced apart from one another in the circumferential direction, the plurality of first magnets being provided in an even number,
   wherein two adjacent first magnets among the plurality of first magnets are configured to define different magnetic poles from each other,
   wherein the second magnet comprises a plurality of second magnets that are spaced apart from one another in the circumferential direction, the plurality of second magnets being provided in the even number, wherein two adjacent second magnets among the plurality of second magnets are configured to define different magnetic poles from each other, and
   wherein one of the plurality of first magnets and one of the plurality of second magnets face each other in the axial direction and are configured to define different magnetic poles from each other.

2. The transverse flux reciprocating motor of claim 1, wherein the coil comprises a plurality of coils that are spaced apart from one another in the circumferential direction, the plurality of coils being provided in an even number, and wherein two adjacent coils among the plurality of coils are configured to generate magnetic flux in opposite directions to each other.

3. The transverse flux reciprocating motor of claim 1, wherein the coil comprises a plurality of coils spaced apart from one another in the circumferential direction and arranged symmetrically with respect to a center area of the outer stator, the plurality of coils being provided in an even number.

4. The transverse flux reciprocating motor of claim 1, wherein the plurality of first magnets are arranged symmetrically with respect to a center area of the outer stator, and
   wherein the plurality of second magnets are arranged symmetrically with respect to the center area of the outer stator.

5. The transverse flux reciprocating motor of claim 1, wherein an axial length of the inner stator corresponds to an axial length of the first magnet or the second magnet.

6. The transverse flux reciprocating motor of claim 1, wherein an axial length of the outer stator is greater than a sum of an axial length of the first magnet, an axial length of the second magnet, and an axial separation distance between the first magnet and the second magnet.

7. The transverse flux reciprocating motor of claim 1, wherein an axial length of the outer stator is less than a sum of an axial length of the first magnet, an axial length of the second magnet, and an axial separation distance between the first magnet and the second magnet.

8. A transverse flux reciprocating motor comprising:
   an outer stator comprising:
      a stator core comprising a plurality of core plates stacked in an axial direction,
      a teeth portion that extends from the stator core to an inside of the stator core, and
      a teeth shoe that extends from an inner end of the teeth portion in a circumferential direction of the stator core;
   a coil disposed at the teeth portion;
   an inner stator disposed in the outer stator and configured to reciprocate relative to the outer stator in the axial direction based on electromagnetic interaction with the coil;
   a magnet that is disposed at the teeth shoe and faces the inner stator; and
   a virtual pole disposed at the teeth shoe, the virtual pole facing the inner stator and being spaced apart from the magnet in the axial direction,
   wherein the magnet comprises a plurality of magnets that are spaced apart from one another in the circumferential direction, the plurality of magnets being provided in an even number, wherein two adjacent magnets among the plurality of magnets are configured to define different magnetic poles from each other,
   wherein the virtual pole comprises a plurality of virtual poles that are spaced apart from one another in the circumferential direction, the plurality of virtual poles being provided in an even number, wherein two adjacent virtual poles among the plurality of virtual poles are configured to define different magnetic poles from each other, and
   wherein one of the plurality of magnets and one the plurality of virtual poles face each other in the axial direction and are configured to define different magnetic poles from each other.

9. The transverse flux reciprocating motor of claim 8, wherein the coil comprises a plurality of coils that are spaced apart from one another in the circumferential direction, the plurality of coils being provided in an even number, and
   wherein two adjacent coils among the plurality of coils are configured to generate magnetic flux in opposite directions to each other.

10. The transverse flux reciprocating motor of claim 8, wherein the coil comprises a plurality of coils spaced apart from one another in the circumferential direction and arranged symmetrically with respect to a center area of the outer stator, the plurality of coils being provided in an even number.

11. The transverse flux reciprocating motor of claim 8, wherein the plurality of magnets are arranged symmetrically with respect to a center area of the outer stator, and
   wherein the plurality of virtual poles are arranged symmetrically with respect to the center area of the outer stator.

12. The transverse flux reciprocating motor of claim 8, wherein an axial length of the inner stator corresponds to an axial length of the magnet or the virtual pole.

13. The transverse flux reciprocating motor of claim 8, wherein an axial length of the outer stator is greater than a sum of an axial length of the magnet, an axial length of the virtual pole, and an axial separation distance between the magnet and the virtual pole.

14. The transverse flux reciprocating motor of claim 8, wherein an axial length of the outer stator is less than a sum of an axial length of the magnet, an axial length of the virtual pole, and an axial separation distance between the magnet and the virtual pole.

15. The transverse flux reciprocating motor of claim 8, wherein the virtual pole is a part of the teeth shoe.

16. The transverse flux reciprocating motor of claim 15, wherein an axial length of the inner stator corresponds to an axial length of the magnet, and
   wherein an axial length of the outer stator is greater than a sum of an axial length of the magnet, an axial length of the virtual pole, and an axial separation distance between the magnet and the virtual pole.

17. A linear compressor comprising:
a frame;
a cylinder disposed in the frame;
a piston disposed in the cylinder;
an outer stator disposed in the frame, the outer stator comprising:
   a stator core comprising a plurality of core plates stacked in an axial direction,
   a teeth portion that extends from the stator core to an inside of the stator core, and
   a teeth shoe that extends from an inner end of the teeth portion in a circumferential direction of the stator core;
a coil disposed at the teeth portion;
an inner stator coupled to the piston and configured to reciprocate relative to the outer stator in the axial direction based on electromagnetic interaction with the coil; and
a magnet that is disposed at the teeth shoe and faces the inner stator, the magnet comprising a first magnet and a second magnet that are spaced apart from each other in the axial direction,
wherein the first magnet comprises a plurality of first magnets spaced apart from one another in the circumferential direction and arranged symmetrically with respect to a center area of the outer stator, the plurality of first magnets being provided in an even number, and
wherein the second magnet comprises a plurality of second magnets spaced apart from one another in the circumferential direction and arranged symmetrically with respect to the center area of the outer stator, the plurality of second magnets being provided in the even number.

18. A linear compressor comprising:
a frame;
a cylinder disposed in the frame;
a piston disposed in the cylinder;
an outer stator disposed in the frame, the outer stator comprising:
   a stator core comprising a plurality of core plates stacked in an axial direction,
   a teeth portion that extends from the stator core to an inside of the stator core, and
   a teeth shoe that extends from an inner end of the teeth portion in a circumferential direction of the stator core;
a coil disposed on the teeth portion;
an inner stator coupled to the piston and configured to reciprocate relative to the outer stator in the axial direction based on electromagnetic interaction with the coil;
a magnet that is disposed at the teeth shoe and faces the inner stator; and
a virtual pole disposed at the teeth shoe, the virtual pole facing the inner stator and being spaced apart from the magnet in the axial direction,
wherein the magnet comprises a plurality of magnets spaced apart from one another in the circumferential direction and arranged symmetrically with respect to a center area of the outer stator, the plurality of magnets being provided in an even number, and
wherein the virtual pole comprises a plurality of virtual poles spaced apart from one another in the circumferential direction and arranged symmetrically with respect to the center area of the outer stator, the plurality of virtual poles being provided in the even number.

* * * * *